US012508315B2

(12) United States Patent
Patil

(10) Patent No.: US 12,508,315 B2
(45) Date of Patent: Dec. 30, 2025

(54) USE OF VITAMIN E TPGS AS A TASTE MASKING AGENT FOR BITTER DRUGS

(71) Applicant: Hyloris Developments SA, Liège (BE)

(72) Inventor: Atul Patil, Liège (BE)

(73) Assignee: Hyloris Developments SA, Liege (BE)

(*) Notice: Subject to any disclaimer, the term of this patent is extended or adjusted under 35 U.S.C. 154(b) by 0 days.

(21) Appl. No.: 18/912,152

(22) Filed: Oct. 10, 2024

(65) Prior Publication Data

US 2025/0049925 A1 Feb. 13, 2025

Related U.S. Application Data

(63) Continuation of application No. PCT/EP2024/051756, filed on Jan. 25, 2024.

(60) Provisional application No. 63/511,863, filed on Jul. 4, 2023, provisional application No. 63/481,814, filed on Jan. 27, 2023.

(51) Int. Cl.
| | |
|---|---|
| *A61K 47/22* | (2006.01) |
| *A61J 7/00* | (2006.01) |
| *A61K 9/08* | (2006.01) |
| *A61K 31/138* | (2006.01) |
| *A61K 47/02* | (2006.01) |
| *A61K 47/10* | (2017.01) |
| *A61K 47/14* | (2017.01) |
| *A61K 47/26* | (2006.01) |
| *A61K 47/46* | (2006.01) |

(52) U.S. Cl.
CPC ............. *A61K 47/22* (2013.01); *A61J 7/0053* (2013.01); *A61K 9/08* (2013.01); *A61K 31/138* (2013.01); *A61K 47/02* (2013.01); *A61K 47/10* (2013.01); *A61K 47/14* (2013.01); *A61K 47/26* (2013.01); *A61K 47/46* (2013.01)

(58) Field of Classification Search
CPC .............. A61K 9/0095; A61K 9/4866; A61K 2300/00; A61K 31/57; A61K 31/573; A61K 47/26; A61K 47/38; A61K 9/08; A61K 31/565; A61K 47/12; A61K 47/24; A61K 47/34; A61K 9/0019; A61K 9/485; A61K 9/4858; A61K 31/138; A61K 31/167; A61K 31/49; A61K 31/522; A61K 47/02; A61K 47/10; A61K 47/14; A61K 47/22; A61K 47/32; A61K 47/46; A61P 25/08; A61P 25/00; A61J 7/0053
See application file for complete search history.

(56) References Cited

U.S. PATENT DOCUMENTS

| | | | | |
|---|---|---|---|---|
| 9,855,228 | B1* | 1/2018 | Lin | A61K 47/36 |
| 10,028,967 | B2* | 7/2018 | Rosa | A61K 9/0056 |
| 2006/0079582 | A1* | 4/2006 | Jonas | A61K 45/06 |
| | | | | 514/662 |
| 2011/0306660 | A1* | 12/2011 | Goskonda | A61K 9/0095 |
| | | | | 514/454 |
| 2015/0165034 | A1* | 6/2015 | Lewerenz | A61K 47/22 |
| | | | | 514/20.9 |
| 2019/0160078 | A1* | 5/2019 | Masuoka | A61K 47/26 |
| 2020/0253922 | A1* | 8/2020 | Boylan | A61K 47/10 |

FOREIGN PATENT DOCUMENTS

| | | |
|---|---|---|
| CN | 114306234 A | 4/2022 |
| EP | 3003384 B1 | 10/2016 |
| WO | WO2015/144255 A1 * 10/2015 | ............. A61K 47/26 |

OTHER PUBLICATIONS

Matthijssen, Anne-Flore M. et al. Continued Benefits of Methylphenidate in ADHD After 2 Years in Clinical Practice: A Randomized Placebo-Controlled Discontinuation Study. American Journal of Psychiatry, 2019, 176(9):754-762. (Year: 2019).*
Jakob, I. et al., MDR1 in taste buds of rat vallate papilla: functional, immunohistochemical, and biochemical evidence, American Journal of Physiology-Cell Physiology 1998, 274(1), C182-C191.
Walsh, J. et al., Playing hide and seek with poorly tasting paediatric medicines: Do not forget the excipients, Advanced Drug Delivery Reviews 2014, 73, 14-33.
Li, et al., Quantitative prediction of the bitterness of atomoxetine hydrochloride and taste-masked using hydroxypropyl-β-cyclodextrin: A biosensor evaluation and interaction study, Asian Journal of Pharmaceutical Sciences 2020, 15, 492-505.
Collnot, et al., Vitamin E TPGS P-Glycoprotein Inhibition Mechanism: Influence on Conformational Flexibility, Intracellular ATP Levels, and Role of Time and Site of Access, Molecular Pharmaceutics 2010, 7(3), 642-651.
PCT/EP2024/051756 Written Opinion of the International Searching Authority, May 16, 2024.

* cited by examiner

*Primary Examiner* — Audrea B Coniglio
(74) *Attorney, Agent, or Firm* — Vance Intellectual Property, PC

(57) ABSTRACT

The invention involves novel, oral solutions of bitter drugs using Vitamin E TPGS as a masking agent and methods of using the same (e.g., for treating attention deficit/hyperactivity disorder (ADHD)). Atomoxetine (e.g., Atomoxetine HCl) is an example of a bitter drug whose bitterness can be masked by the presence of Vitamin E TPGS alone or in combination with additional ingredients.

17 Claims, No Drawings

USE OF VITAMIN E TPGS AS A TASTE MASKING AGENT FOR BITTER DRUGS

TECHNICAL FIELD

The invention described herein involves the use of D-α-Tocopherol Polyethylene Glycol Succinate (Vitamin E TPGS) as a taste masking agent for bitter active pharmaceutical ingredients.

BACKGROUND OF THE INVENTION

Bitter drugs are well known and pose challenges when oral solutions are needed (e.g., for pediatric care or patients who struggle with oral medicines). Examples of bitter drugs include atomoxetine, levocetirizine, cetirizine, valdecoxib, codeine, methylphenidate, amphetamine, dextroamphetamine, viloxazine, and guanfacine.

There are many taste masking strategies that are reported in the literature. These include masking with sweeteners and flavor, taste protecting by way of granulation, flavour or taste masking via microencapsulation, ion exchange resins, taste covering by way of adsorption, liposomes, multiple emulsions, taste protecting by means of gelation, taste masking by means of prodrug, and inclusion complexes. (See, for example https://www.americanpharmaceuticalreview.com/Featured-Articles/163483-Taste-Masking-Techniques-in-the-Pharmaceutical-Industry/).

In view of the ongoing challenges of masking bitter tasting drugs, it would be beneficial to develop a taste masking platform to accommodate a variety of bitter drugs with different doses and different therapeutic indications where patient compliance and palatability is a challenge.

Atomoxetine Hydrochloride (Atomoxetine HCl) is a well-known active ingredient and is available in oral capsules in 10 mg, 18 mg, 25 mg, 40 mg, 60 mg, 80 mg, and 100 mg dosages. Its chemical name is (−)-N-Methyl-3-phenyl-3-(o-tolyloxy)-propylamine hydrochloride. The molecular formula is $C_{17}H_{21}NO \cdot HCl$, which corresponds to a molecular weight of 291.82. The chemical structure is as follows.

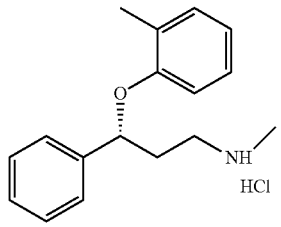 [SMILES: CNCC[C@@H](Oc1ccccc1C)c1ccccc1 ; Cl]

Atomoxetine HCl was the first non-stimulant drug approved by USFDA for the treatment of Attention-Deficit-Hyperactivity Disorder (ADHD) in children. It is currently available as capsules in the US market. For the pediatric population, it would be beneficial to have this drug delivered in liquid formulation. However, atomoxetine has an extremely bitter in taste and to improve its patient compliance and palatability it is critical to have a taste masked formulation, specifically for the pediatric population.

The product is available in Europe as a 4 mg/mL oral solution and contains a sweetener and raspberry flavor along with other excipients, but no taste masking excipients are used to effectively mask the bitterness of the atomoxetine.

U.S. Pat. Nos. 9,855,228 and 9,993,445 describe oral atomoxetine formulations that attempt to mask the bitterness of atomoxetine using a combination of ingredients, including sulfobutylether-β-cyclodextrin, pullulan, and the combination of peppermint and orange flavors. Unfortunately, Sulfobutylether-β-cyclodextrin is not a pharmaceutical excipient approved by the USFDA. These patents are silent regarding the use of Vitamin E TPGS.

Inclusion complexation is a system in which the guest molecule is included in the hollow space of a bunch or complexing agent. The complexing agent can cover the sour taste of drug both reducing its oral solubility on ingestion or decreasing the amount of drug particles uncovered for interaction with taste buds. Cyclodextrin is the most broadly used complexing agent for inclusion type complexes. It is a nontoxic, cyclic oligosaccharide acquired from starch. Drugs with bitter taste may be suppressed by making inclusion complexes, one such literature which exemplifies use of Cyclodextrin in taste masking of Atomoxetine is Li et al. (see Asian J. Pharma. Sci 2020, 15(4), 492-505). Walsh et al. (see Adv. Drug Delivery Rev. 2014, 73, 14-33) provides many examples of taste masking with different techniques. However, it is believed that the use or application of Atomoxetine in ADHD is for long term and formulations that contain cyclodextrin are not safe beyond 14 days when taken orally and sufficient safety data to justify such long-term use is not available.

Hence there is unmet need to develop a safe, effective taste masked oral solution of bitter drugs (e.g., atomoxetine) where taste of the active ingredient is a limiting factor for patient compliance.

SUMMARY OF THE INVENTION

In an aspect, there are described novel, oral solutions, comprising a pharmaceutically effective amount of a bitter drug, Vitamin E TPGS as a taste-masking agent, and water.

In another aspect, the bitter drug is atomoxetine.

These and other aspects, which will become apparent during the following detailed description, have been achieved by the inventors' surprising discovery that Vitamin E TPGS can be used as a taste-masking agent.

In a preferred embodiment the invention provides a palatable oral solution, comprising:
a. a bitter active pharmaceutical ingredient;
b. 5-50 mg/mL Vitamin E TPGS;
c. water;
d. optionally one or more of the following auxiliary ingredients: co-solvent, preservative, sweetener, flavoring agent, pH-adjusting agent.

Preferably, the bitter active pharmaceutical ingredient (API) is selected from atomoxetine, atomoxetine hydrochloride, ranitidine hydrochloride, quinine, paracetamol, colchicine, cetirizine, cetirizine hydrochloride, levocetirizine, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride, valdecoxib, codeine, methylphenidate, amphetamine, dextroamphetamine, viloxazine, and guanfacine.

More preferably, the bitter active pharmaceutical ingredient (API) is selected from atomoxetine hydrochloride, ranitidine hydrochloride, quinine, paracetamol, colchicine, cetirizine hydrochloride, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride.

As used herein, active pharmaceutical ingredient (API), drug, and drug substance are synonyms.

More preferably, the bitter active pharmaceutical ingredient is atomoxetine; even more preferably is atomoxetine hydrochloride. Most preferably, the palatable oral solution comprises 4-8 mg/ml atomoxetine hydrochloride.

In a preferred embodiment, there is only a single active pharmaceutical substance present in the palatable oral solution. There is no other active pharmaceutical ingredient present.

In a preferred embodiment, the palatable oral solution of the invention does not contain an ion exchange resin and/or sorbitol.

In a preferred embodiment, the palatable oral solution comprises a co-solvent, which is preferably selected from propylene glycol, glycerol, or a combination thereof.

In a preferred embodiment, the palatable oral solution comprises one or more preservatives. Preferably, the one or more preservatives are selected from methyl paraben, ethyl paraben, butyl paraben, or a combination thereof.

In a preferred embodiment, the palatable oral solution comprises a sweetener. Preferably the sweetener is selected from sucralose, monoammonium glycyrrhizinate, acesulfame K, aspartame, or a combination thereof.

In a preferred embodiment, the palatable oral solution comprises a flavoring agent. Preferably the flavoring agent is selected from cherry flavor, orange flavor, peppermint, or a combination thereof.

In a preferred embodiment, the palatable oral solution is free of sorbitol.

In a preferred embodiment, the palatable oral solution has a pH of 4 to 8; preferably, a pH of 4 to 7, more preferably, a pH of 4 to 6, and even more preferably pH of 4 to 5.

In a preferred embodiment, the pH-adjusting agent is O-phosphoric acid.

More preferably the palatable oral solution consists of:
4-8 mg/mL atomoxetine HCl;
12.5-25 mg/mL Vitamin E TPGS;
25-120/mL of propylene glycol;
1.5-2 mg/mL methyl paraben;
0.1-0.4 mg/mL propyl paraben;
4-6 mg/mL of sucralose;
1-3 mg/mL of cherry flavor;
and water.

In a preferred embodiment, the palatable oral solution has a shelf-life of at least 45 days once opened.

In a further aspect, the invention provides a palatable oral solution according to an embodiment of the invention, for use as a medicine. Preferably the active pharmaceutical ingredient is atomoxetine or a salt thereof. Most preferably, the active pharmaceutical ingredient is atomoxetine hydrochloride.

Most preferably, the palatable oral solution comprising atomoxetine or a salt thereof as an active pharmaceutical ingredient, is for use in the treatment of attention-deficit/hyperactivity disorder (ADHD).

Most preferably, the palatable oral solution according to an embodiment of the invention is for use in the treatment of a pediatric patient (i.e. of a child).

In a further aspect, the invention provides an oral syringe comprising a palatable oral solution according to an embodiment of the invention, wherein the oral syringe is provided for dosing of 5-10 ml of the palatable oral solution.

In a final aspect, the invention provides the use of vitamin E TPGS as a taste masking agent in a palatable oral solution comprising the bitter active pharmaceutical ingredient. Preferably the bitter active pharmaceutical ingredient is selected from atomoxetine, atomoxetine hydrochloride, ranitidine hydrochloride, quinine, paracetamol, colchicine, cetirizine, cetirizine hydrochloride, levocetirizine, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride, valdecoxib, codeine, methylphenidate, amphetamine, dextroamphetamine, viloxazine, and guanfacine.

More preferably, the bitter active pharmaceutical ingredient is selected from atomoxetine hydrochloride, ranitidine hydrochloride, quinine, paracetamol, colchicine, cetirizine hydrochloride, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride.

DETAILED DESCRIPTION OF THE INVENTION

Exemplary aspects of the invention are described herein. Although the following detailed description contains many specifics for purposes of illustration, a person of ordinary skill in the art will appreciate that variations and alterations to the following details are within the scope of the invention. Accordingly, the following aspects of the invention are set forth without any loss of generality to, and without imposing limitations upon, the claimed invention.

Vitamin E TPGS as a Taste-Masking Agent

Vitamin E d-α-tocopheryl poly(ethylene glycol) 1000 succinate (also known as Vitamin E d-α-tocopheryl ethylene glycol succinate, Vitamin E TPGS, TPGS Tocophersolan, and/or TPGS) is a non-ionic surfactant. The structure is shown below.

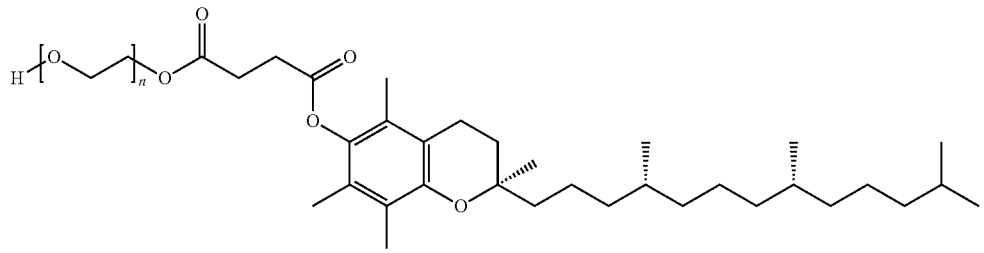

Vitamin E TPGS is synthesized by esterification of vitamin E succinate with poly(ethylene glycol) (PEG) 1000. It is known to be an excellent solubilizer, emulsifier, and permeation and bioavailability enhancer. It was not known as a taste-masking agent. In fact, the discovery of its taste masking capabilities for bitter active pharmaceutical ingredients was unexpected.

TPGS is a waxy solid with a melting point of 37-41° C. and remains stable up to 199° C. It has particularly attracted the interest of the pharmaceutical industry for this resistance to high temperatures without deterioration. In addition, due to its amphiphilic nature, TPGS is capable of self-assembling in water above its critical micellar concentration (CMC), equal to 0.02 wt %, in nanosized aggregates of about 13 nm. In this context, TPGS has been widely studied as an absorption and permeation enhancer, emulsifier, and solubilizing agent. However, this is the first time this excipient is being used as a taste masking agent.

An aspect of the invention involves a novel, palatable oral solution, comprising:
a. bitter active pharmaceutical ingredient;
b. Vitamin E TPGS; and,
c. water;
wherein the Vitamin E TPGS acts as a taste-masking agent.

Palatable refers to a solution that is less bitter than one absent masking with Vitamin E TPGS.

Bitter refers to the taste of the unmasked pharmaceutical in an oral solution. In some aspects, a bitter active pharmaceutical scores at least a 3 on the bitterness scale (see Table 5 below).

In some aspects, the bitter active ingredient is selected from the group atomoxetine, atomoxetine hydrochloride, ranitidine hydrochloride, quinine, paracetamol, colchicine, cetirizine, cetirizine hydrochloride, levocetirizine, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride, valdecoxib, codeine, methylphenidate, amphetamine, dextroamphetamine, viloxazine, and guanfacine. Preferably, the bitter active pharmaceutical ingredient is selected from atomoxetine hydrochloride, ranitidine hydrochloride, quinine, paracetamol, colchicine, cetirizine hydrochloride, levocetirizine hydrochloride, ibuprofen, erythromycin, ciprofloxacin, chlorpheniramine maleate, aspirin (acetylsalicylic acid), dextromethorphan hydrobromide, cinacalcet hydrochloride In some aspects, the amount (e.g., mg of ingredient) of the bitter active ingredient present is the amount required for a given dosage (a pharmaceutically effective amount) or higher. For example, if the dosage were a 5 mL oral solution, then the amount (in mg/mL) of the bitter active ingredient can be X mg/5 mL. In other aspects, the amount of bitter active ingredient present is higher than the minimum required dosage (e.g., 1.5 X mg/mL). An increased concentration would allow for dilution and/or smaller dosages.

In some aspects, the amount of Vitamin E TPGS present in the oral solution is about 0.1-50 mg/mL, 5-50 mg/mL, about 0.1-25 mg/mL, about 12.5-25 mg/mL, about 5-25 mg/mL, or about 5-30 mg/mL. Additional examples include about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 to/and about 50 mg/mL.

In some aspects, the solution further comprises one or more of the following:
d. a cosolvent;
e. a preservative;
f. a sweetener; and/or
g. a flavoring agent.

In some aspects, the solution further comprises two or more of the following:
d. a cosolvent;
e. a preservative;
f. a sweetener; and/or
g. a flavoring agent.

In some aspects, the solution further comprises three or all four of the following:
d. a cosolvent;
e. a preservative;
f. a sweetener; and/or
g. a flavoring agent.

In some aspects, the solution further comprises a pH adjusting agent.

Water in the oral solution is considered a solvent.

In some aspects, the solution further comprises a co-solvent. Examples of cosolvents include propylene glycol, glycerol, and a combination thereof. In some aspects, the amount of cosolvent present in the oral solution is about 1-150 mg/ml, about 25-120 mg/mL, about 40-60 mg/mL, 60-80 mg/mL and/or about 110-120 mg/mL. Additional examples include about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, to/and about 150 mg/mL.

In some aspects, the co-solvent is propylene glycol.

In some aspects, the co-solvent is glycerol.

In some aspects, the co-solvent is a combination of propylene glycol and glycerol.

In some aspects, the solution further comprises:
about 25-120 mg/mL of propylene glycol; and,
about 60-80 mg/mL of glycerol.

In some aspects, the solution further comprises a preservative. Examples of preservatives include methyl paraben, ethyl paraben, butyl paraben, propyl paraben, and a combination thereof (e.g., methyl paraben and propyl paraben).

In some aspects, the amount of preservative present in the oral solution is about 0.1-3 mg/ml, about 0.1-1.5 mg/mL, about 0.1-0.4 mg/mL, and about 1.5-2 mg/mL. Additional examples include about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, to/and about 3 mg/mL.

In some aspects, the solution further comprises a combination of two preservatives.

In some aspects, the solution further comprises:
about 1.5-2 mg/mL of methyl paraben; and,
about 0.1-0.4 mg/mL of propyl paraben.

In some aspects, the solution further comprises one or more sweeteners. Examples of sweeteners include sucralose, monoammonium glycyrrhizinate, acesulfame K, aspartame, and a combination thereof.

In some aspects, the amount of sweetener present in the oral solution is about 0.1-10 mg/mL, about 2-8 mg/mL, or about 4-6 mg/mL. Additional examples include 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, to/and about 10 mg/mL.

In some aspects, the sweetener is sucralose.

In some aspects, the oral solution further comprises:
about 4-6 mg/mL of sucralose.

In some aspects, the solution further comprises one or more flavoring agents. Examples of flavoring agents include cherry flavor, orange flavor, peppermint, and the combination of orange and peppermint.

In some aspects, the flavoring agent is cherry flavor.

In some aspects, the amount of flavoring agent present in the oral solution is about 0.1-10 mg/mL, about 1-5 mg/mL, about 0.5-3 mg/mL about 1-3 mg/mL, or about 0.5-1.5 mg/mL. Additional examples include 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, to/and about 10 mg/mL.

In some aspects, the flavoring agent is cherry flavor.

In some aspects, the oral solution further comprises:
about 1-3 mg/mL of cherry flavor.

In some aspects, the flavoring agent is a combination of orange and peppermint flavors.

In some aspects, the oral solution further comprises:
about 0.5-1.5 mg/mL of orange flavor; and,
about 0.5-1.5 mg/mL of peppermint flavor.

In some aspects, the solution comprises
about 0.5-50 mg/mL of Vitamin E TPGS,
about 4-6 mg/mL of sweetener; and,
about 0.5-3 mg/mL of flavoring agent.

In some aspects, the solution comprises one of the combinations (a)-(g) shown in Table A

TABLE A

| Vitamin E TPGS (mg/mL) | Sweetener (mg/mL) | Flavoring Agent (mg/mL) |
|---|---|---|
| a about 0.5-50 | about 4-6 Sucralose | about 0.5-3 Cherry Flavor |
| b about 0.5-50 | about 4-6 Sucralose | about 0.5-3 Orange Flavor |
| c about 0.5-30 | about 4-6 monoammonium glycyrrhizinate | about 0.5-3 Peppermint |
| d about 0.5-25 | about 4-6 Sucralose | about 0.5-3 Orange + Peppermint |
| e about 0.5-25 | about 4-6 monoammonium glycyrrhizinate | about 0.5-3 Orange + Peppermint |
| f about 0.5-25 | about 4-6 Acesulfame K | about 0.5-3 Orange + Peppermint |
| g about 0.5-25 | about 4-6 Aspartame | about 0.5-3 Orange + Peppermint |

In some aspects, the pH of the solution is about 4-8, about 4-5, about 4-6, or about 5-7. Examples include about 4, 4.5, 5, 5.5, 6, 6.5, 7, 7.5, to/and about 8.

In some aspects, the pH of the solution is adjusted with O-phosphoric acid (e.g., 85%) to achieve the desired pH (e.g., between 4-5).

In some aspects, the solution comprises O-phosphoric acid.

In some aspects, sodium benzoate is absent from the solution.

In some aspects, the palatable oral solution comprises:
a. a bitter active pharmaceutical ingredient;
b. about 5-50 mg/mL Vitamin E TPGS; and,
c. water.

In some aspects, the oral solution comprises:
a. a bitter active pharmaceutical ingredient;
b. about 5-50 mg/mL Vitamin E TPGS;
c. a cosolvent; and,
d. water.

In some aspects, the oral solution comprises:
a. a bitter active pharmaceutical ingredient;
b. about 5-50 mg/mL Vitamin E TPGS;
c. a preservative; and,
d. water.

In some aspects, the oral solution comprises:
a. a bitter active pharmaceutical ingredient;
b. about 5-50 mg/mL Vitamin E TPGS;
c. a sweetener; and,
d. water.

In some aspects, the oral solution comprises:
a. a bitter active pharmaceutical ingredient;
b. about 5-50 mg/mL Vitamin E TPGS;
c. a flavoring agent; and,
d. water.

In some aspects, the oral solution comprises:
a. a bitter active pharmaceutical ingredient;
b. about 5-50 mg/mL Vitamin E TPGS;
c. a cosolvent;
d. a sweetener;
e. a flavoring agent; and,
f. water.

In some aspects, the oral solution comprises:
a. a bitter active pharmaceutical ingredient;
b. about 5-50 mg/mL Vitamin E TPGS;
c. a cosolvent;
d. a preservative;
e. a sweetener;
f. a flavoring agent; and,
In some aspects, the solution further comprises a pH adjusting agent.

Atomoxetine HCL Oral Formulations

An aspect of the invention involves a novel, oral, atomoxetine solution, comprising:
a. Atomoxetine HCl;
b. Vitamin E TPGS; and,
c. Water;
wherein the Vitamin E TPGS acts as a taste-masking agent.

In some aspects, the amount (e.g., mg of ingredient) of atomoxetine HCl present is the amount required for a given dosage (a pharmaceutically effective amount) or higher. For example, if the dosage were a 5 mL oral solution, then the amount (in mg/mL) of the bitter active ingredient can be X mg/5 mL. In other aspects, the amount of atomoxetine present is higher than the minimum required dosage (e.g., 1.5 X mg/mL). An increased concentration would allow for dilution and/or smaller dosages.

Atomoxetine HCl is a USFDA approved salt form of atomoxetine. An alternative salt of atomoxetine can be used in the solutions described herein.

In some aspects, the amount of atomoxetine present in the atomoxetine solution is about 1-20 mg/ml, about 2-10 mg/mL, or about 4-8 mg/mL. Additional examples include about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, to/and about 20 mg/mL.

In some aspects, the amount of Vitamin E TPGS present in the atomoxetine solution is about 0.1-50 mg/mL, 5-50 mg/mL, about 0.1-25 mg/mL, about 12.5-25 mg/mL, about 5-25 mg/mL, or about 5-30 mg/mL. Additional examples include about 0.1, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49 to/and about 50 mg/mL.

In some aspects, the atomoxetine solution further comprises one or more of the following:
 d. a cosolvent;
 e. a preservative;
 f. a sweetener; and/or
 g. a flavoring agent.

In some aspects, the atomoxetine solution further comprises two or more of the following:
 d. a cosolvent;
 e. a preservative;
 f. a sweetener; and/or
 g. a flavoring agent.

In some aspects, the atomoxetine solution further comprises three or all four of the following:
 d. a cosolvent;
 e. a preservative;
 f. a sweetener; and/or
 g. a flavoring agent.

In some aspects, the atomoxetine solution further comprises a pH adjusting agent.

Water in the atomoxetine solution is considered a solvent.

In some aspects, the atomoxetine solution further comprises a co-solvent. Examples of cosolvents include propylene glycol, glycerol, and a combination thereof. In some aspects, the amount of cosolvent present in the oral solution is about 1-150 mg/ml, about 25-120 mg/mL, about 40-60 mg/mL, 60-80 mg/mL, and/or about 110-120 mg/mL. Additional examples include about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, to/and about 150 mg/mL.

In some aspects, the co-solvent is propylene glycol. In another aspect, about 25-120 mg/mL of propylene glycol is present.

In some aspects, the co-solvent is glycerol. In another aspect, about 60-80 mg/ml of glycerol is present.

In some aspects, the co-solvent is a combination of propylene glycol and glycerol.

In some aspects, the atomoxetine solution further comprises:
 about 25-120 mg/mL of propylene glycol; and,
 about 60-80 mg/mL of glycerol.

In some aspects, the atomoxetine solution further comprises a preservative. Examples of cosolvents methyl paraben, ethyl paraben, butyl paraben, propyl paraben, and a combination thereof (e.g., methyl paraben and propyl paraben). In some aspects, the amount of preservative present in the oral solution is about 0.1-3 mg/ml, about 0.1-1.5 mg/mL, about 0.1-0.4 mg/mL, and about 1.5-2 mg/mL. Additional examples include about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, to/and about 3 mg/mL.

In some aspects, the atomoxetine solution further comprises a combination of two preservatives.

In some aspects, the atomoxetine solution further comprises:
 about 1.5-2 mg/mL of methyl paraben; and,
 about 0.1-0.4 mg/mL of propyl paraben.

In some aspects, the atomoxetine solution further comprises one or more sweeteners. Examples of sweeteners include sucralose, monoammonium glycyrrhizinate (sold as Magnasweet®), acesulfame K, aspartame, and a combination thereof.

In some aspects, the amount of sweetener present in the oral solution is about 0.1-10 mg/mL, about 2-8 mg/mL, or about 4-6 mg/mL. Additional examples include 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, to/and about 10 mg/mL.

In some aspects, the sweetener is sucralose.

In some aspects, the atomoxetine solution further comprises:
 about 4-6 mg/mL of sucralose.

In some aspects, the atomoxetine solution further comprises one or more flavoring agents. Examples of flavoring agents include cherry flavor, orange flavor, peppermint, and the combination of orange and peppermint.

In some aspects, the flavoring agent is cherry flavor.

In some aspects, the amount of flavoring agent present in the oral solution is about 0.1-10 mg/mL, about 1-5 mg/mL, about 0.5-3 mg/mL about 1-3 mg/mL, or about 0.5-1.5 mg/mL. Additional examples include 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, 9, 9.1, 9.2, 9.3, 9.4, 9.5, 9.6, 9.7, 9.8, 9.9, to/and about 10 mg/mL.

In some aspects, the flavoring agent is cherry flavor.

In some aspects, the atomoxetine solution, further comprises:
 about 1-3 mg/mL of cherry flavor.

In some aspects, the flavoring agent is a combination of orange and peppermint flavors.

In some aspects, the atomoxetine solution further comprises:
 about 0.5-1.5 mg/mL of orange flavor; and,
 about 0.5-1.5 mg/mL of peppermint flavor.

In some aspects, the atomoxetine solution comprises about 0.5-50 mg/mL of Vitamin E TPGS,
 about 4-6 mg/mL of sweetener; and,
 about 0.5-3 mg/mL of flavoring agent.

In some aspects, the atomoxetine solution comprises one of combinations (a)-(g) shown in Table A

TABLE A

| | Vitamin E TPGS (mg/mL) | Sweetener (mg/mL) | Flavoring Agent (mg/mL) |
|---|---|---|---|
| a | about 0.5-50 | about 4-6 Sucralose | about 0.5-3 Cherry Flavor |
| b | about 0.5-50 | about 4-6 Sucralose | about 0.5-3 Orange Flavor |
| c | about 0.5-30 | about 4-6 monoammonium glycyrrhizinate | about 0.5-3 Peppermint |
| d | about 0.5-25 | about 4-6 Sucralose | about 0.5-3 Orange + Peppermint |

TABLE A-continued

| | Vitamin E TPGS (mg/mL) | Sweetener (mg/mL) | Flavoring Agent (mg/mL) |
|---|---|---|---|
| e | about 0.5-25 | about 4-6 monoammonium glycyrrhizinate | about 0.5-3 Orange + Peppermint |
| f | about 0.5-25 | about 4-6 Acesulfame K | about 0.5-3 Orange + Peppermint |
| g | about 0.5-25 | about 4-6 Aspartame | about 0.5-3 Orange + Peppermint |

In some aspects, the pH of the atomoxetine solution is about 4-8, about 4-5, about 4-6, or about 5-7. Examples include about 4, 4.5, 5, 5.5, 6, 6.5, 7, 7.5, to/and about 8.

In some aspects, the pH of the solution is adjusted with O-phosphoric acid (e.g., 85%) to achieve the desired pH (e.g., between 4-5).

In some aspects, the atomoxetine solution comprises O-phosphoric acid.

In some aspects, sodium benzoate is absent from the solution.

In some aspects, the palatable, oral, atomoxetine solution, comprises:
   a. about 4-8 mg/mL atomoxetine HCl;
   b. about 5-50 mg/mL Vitamin E TPGS; and,
   c. water.

In some aspects, the atomoxetine solution comprises:
   a. about 4-8 mg/mL atomoxetine HCl;
   b. about 12.5-25 mg/mL Vitamin E TPGS; and,
   c. water.

In some aspects, the atomoxetine solution comprises:
   a. about 4-8 mg/mL atomoxetine HCl;
   b. about 12.5-25 mg/mL Vitamin E TPGS;
   c. a cosolvent; and,
   d. water.

In some aspects, the atomoxetine solution comprises:
   a. about 4-8 mg/mL atomoxetine HCl;
   b. about 12.5-25 mg/mL Vitamin E TPGS;
   c. about 25-120 mg/mL of propylene glycol; and,
   d. water.

In some aspects, the atomoxetine solution comprises:
   a. about 4-8 mg/mL atomoxetine HCl;
   b. about 12.5-25 mg/mL Vitamin E TPGS;
   c. a preservative; and,
   d. water.

In some aspects, the atomoxetine solution comprises:
   a. about 4-8 mg/mL atomoxetine HCl;
   b. about 12.5-25 mg/mL Vitamin E TPGS;
   c. a preservative, comprising:
      a. about 1.5-2 mg/mL of methyl paraben; and,
      b. about 0.1-0.4 mg/mL of propyl paraben; and,
   d. water.

In some aspects, the atomoxetine solution comprises:
   a. about 4-8 mg/mL atomoxetine HCl;
   b. about 12.5-25 mg/mL Vitamin E TPGS;
   c. a sweetener; and,
   d. water.

In some aspects, the atomoxetine solution comprises:
   a. about 4-8 mg/mL atomoxetine HCl;
   b. about 12.5-25 mg/mL Vitamin E TPGS;
   c. about 4-6 mg/mL of sucralose; and,
   d. water.

In some aspects, the atomoxetine solution comprises:
   a. about 4-8 mg/mL atomoxetine HCl;
   b. about 12.5-25 mg/mL Vitamin E TPGS;
   c. a flavoring agent; and,
   d. water.

In some aspects, the atomoxetine solution comprises:
   a. about 4-8 mg/mL atomoxetine HCl;
   b. about 12.5-25 mg/mL Vitamin E TPGS;
   c. about 1-3 mg/mL of cherry flavor; and,
   d. water.

In some aspects, the atomoxetine solution comprises:
   a. about 4-8 mg/mL atomoxetine HCl;
   b. about 12.5-25 mg/mL Vitamin E TPGS;
   c. a flavoring agent, comprising:
      a. about 0.5-1.5 mg/mL of orange flavor; and,
      b. about 0.5-1.5 mg/mL of peppermint flavor; and,
   d. water.

In some aspects, the atomoxetine solution comprises:
   a. about 4-8 mg/mL atomoxetine HCl;
   b. about 12.5-25 mg/mL Vitamin E TPGS;
   c. a cosolvent;
   d. a sweetener;
   e. a flavoring agent; and, In some aspects, the atomoxetine solution comprises:
   a. about 4-8 mg/mL atomoxetine HCl;
   b. about 12.5-25 mg/mL Vitamin E TPGS;
   c. about 25-120 mg/mL of propylene glycol;
   d. about 4-6 mg/mL of sucralose;
   e. about 1-3 mg/mL of cherry flavor; and,
   f. water.

In some aspects, the atomoxetine solution comprises:
   a. about 4-8 mg/mL atomoxetine HCl;
   b. about 12.5-25 mg/mL Vitamin E TPGS;
   c. about 25-120 mg/mL of propylene glycol;
   d. about 4-6 mg/mL of sucralose;
   e. a flavoring agent, comprising:
      a. about 0.5-1.5 mg/mL of orange flavor; and,
      b. about 0.5-1.5 mg/mL of peppermint flavor; and,
   f. water.

In some aspects, the atomoxetine solution comprises:
   a. about 4-8 mg/mL atomoxetine HCl;
   b. about 12.5-25 mg/mL Vitamin E TPGS;
   c. a cosolvent;
   d. a preservative;
   e. a sweetener;
   f. a flavoring agent; and, In some aspects, the atomoxetine solution comprises:
   a. about 4-8 mg/mL atomoxetine HCl;
   b. about 12.5-25 mg/mL Vitamin E TPGS;
   c. about 25-120 mg/mL of propylene glycol;
   d. a preservative, comprising:
      a. about 1.5-2 mg/mL of methyl paraben; and,
      b. about 0.1-0.4 mg/mL of propyl paraben; and,
   e. about 4-6 mg/mL of sucralose;
   f. about 1-3 mg/mL of cherry flavor; and,
   g. water.

In some aspects, the atomoxetine solution comprises:
   a. about 4-8 mg/mL atomoxetine HCl;
   b. about 12.5-25 mg/mL Vitamin E TPGS;
   c. about 25-120 mg/mL of propylene glycol;
   d. a preservative, comprising:
      a. about 1.5-2 mg/mL of methyl paraben; and,
      b. about 0.1-0.4 mg/mL of propyl paraben; and,
   e. about 4-6 mg/mL of sucralose;
   f. a flavoring agent, comprising:
      a. about 0.5-1.5 mg/mL of orange flavor; and,
      b. about 0.5-1.5 mg/mL of peppermint flavor; and,
   g. water.

In some aspects, the atomoxetine solution comprises:
   a. about 4-8 mg/mL atomoxetine HCl;
   b. about 12.5-25 mg/mL Vitamin E TPGS;

c. about 114 mg/mL of propylene glycol;
d. a preservative, comprising:
  a. about 1.8 mg/mL of methyl paraben; and,
  b. about 0.2 mg/mL of propyl paraben; and,
e. about 5 mg/mL of sucralose;
f. about 2 mg/mL of cherry flavor; and,
g. water.

In some aspects, the atomoxetine solution comprises:
a. about 4 mg/mL atomoxetine HCl;
b. about 12.5 mg/mL Vitamin E TPGS;
c. about 114 mg/mL of propylene glycol;
d. a preservative, comprising:
  a. about 1.8 mg/mL of methyl paraben; and,
  b. about 0.2 mg/mL of propyl paraben; and,
e. about 5 mg/mL of sucralose;
f. a flavoring agent, comprising:
  a. about 1.1 mg/mL of orange flavor; and,
  b. about 0.8 mg/mL of peppermint flavor; and,
g. water.

In some aspects, the atomoxetine solution comprises:
a. about 4 mg/mL atomoxetine HCl;
b. about 12.5 mg/mL Vitamin E TPGS;
c. about 114 mg/mL of propylene glycol;
d. a preservative, comprising:
  a. about 1.8 mg/mL of methyl paraben; and,
  b. about 0.2 mg/mL of propyl paraben; and,
e. about 5 mg/mL of sucralose;
f. about 2 mg/mL of cherry flavor; and,
g. water.

In some aspects, the atomoxetine solution comprises:
a. about 8 mg/mL atomoxetine HCl;
b. about 25 mg/mL Vitamin E TPGS;
c. about 114 mg/mL of propylene glycol;
d. a preservative, comprising:
  a. about 1.8 mg/mL of methyl paraben; and,
  b. about 0.2 mg/mL of propyl paraben; and,
e. about 5 mg/mL of sucralose;
f. a flavoring agent, comprising:
  a. about 1.1 mg/mL of orange flavor; and,
  b. about 0.8 mg/mL of peppermint flavor; and,
g. water.

In some aspects, the atomoxetine solution comprises:
a. about 8 mg/mL atomoxetine HCl;
b. about 25 mg/mL Vitamin E TPGS;
c. about 114 mg/mL of propylene glycol;
d. a preservative, comprising:
  a. about 1.8 mg/mL of methyl paraben; and,
  b. about 0.2 mg/mL of propyl paraben; and,
e. about 5 mg/mL of sucralose;
f. about 2 mg/mL of cherry flavor; and,
g. water.

In some aspects, the palatable, oral, atomoxetine solution further comprises a pH adjusting agent.

In a preferred embodiment, the palatable, oral, atomoxetine solution has a pH of 4 to 8; preferably, a pH of 4 to 7, more preferably, a pH of 4 to 6, and even more preferably pH of 4 to 5.

In a preferred embodiment, the pH-adjusting agent is O-phosphoric acid.

The invention may be embodied in other specific forms without departing from the spirit or essential attributes thereof. This invention encompasses all combinations of aspects of the invention noted herein. It is understood that any and all embodiments of the invention may be taken in conjunction with any other embodiment or embodiments to describe additional embodiments. It is also to be understood that each individual element of the embodiments is intended to be taken individually as its own independent embodiment. Furthermore, any element of an embodiment is meant to be combined with any and all other elements from any embodiment to describe an additional embodiment.

Definitions

The examples provided in the definitions present in this application are non-inclusive unless otherwise stated. They include but are not limited to the recited examples.

When introducing elements of the present disclosure or an aspect thereof, the articles "a", "an", "the" and "said" are intended to mean that there are one or more of the elements. The terms "comprising", "including" and "having" are intended to be inclusive and mean that there may be additional elements other than the listed elements.

The term "and/or" when used in a list of two or more items, means that any one of the listed items can be employed by itself or in combination with any one or more of the listed items. For example, the expression "A and/or B" is intended to mean either or both of A and B, i.e. A alone, B alone or A and B in combination. The expression "A, B, and/or C" is intended to mean A alone, B alone, C alone, A and B in combination, A and C in combination, B and C in combination, or A, B, and C in combination.

About includes +/−10% of the numerical value.

"Subject" or "patient" are used interchangeably and mean all members of the animal kingdom (e.g., humans).

"Mammal" and "patient" cover warm-blooded mammals that are typically under medical care (e.g., humans and domesticated animals). Examples include feline, canine, equine, bovine, non-human primate, and human, as well as just human.

Other features of the invention will become apparent during the following descriptions of exemplary embodiments that are given for illustration of the invention and are not intended to be limiting thereof.

Examples

Atomoxetine HCl Solubility

Atomoxetine HCl (API, active pharmaceutical ingredient) has good aqueous solubility. Table 1 below shows the quantitative solubility of atomoxetine hydrochloride. From the data, it is evident that, as the pH becomes more basic, solubility decreases but remains very high, 2700-3500 μg/mL in pH 6.8 to 7.4. Human saliva has a pH normal range of 6.2-7.6 with 6.7 being the average pH. Resting pH of the mouth does not fall below 6.3. In the oral cavity, the pH is maintained near neutrality (6.7-7.3) by the saliva. Hence the API should be in (remain in) solution in the oral cavity pH where the taste buds are located, and this is what is believed to lead to the perception of bitterness during consumption of an oral solution thereof.

TABLE 1

| Atomoxetine HCl Solubility | |
| --- | --- |
| Media/Solvent | Absolute Solubility |
| Water | 24.07 mg/mL |
| 0.1N HCl | 13.05 mg/mL |
| 0.1N NaOH | 12.16 mg/mL |
| Acetate Buffer pH: 4.5 | 33.88 mg/mL |
| Phosphate Buffer pH: 6.8 | 3.53 mg/mL |
| Phosphate Buffer pH 7.4 | 2.75 mg/mL |

Table 1 shows that there is no need for a solubilizer to be present in an oral atomoxetine HCl solution. It is also evident that the solubilized form of atomoxetine is going to have a direct impact on taste buds thereby causing immediate bitterness upon drinking the oral solution.

Taste Surrogates

Taste is a subjective perception. Therefore, it is always judged by a pool of people and the formulation which scores the most favorable rating is usually considered to be acceptable to a large patient population. Atomoxetine HCl is a centrally (CNS) acting drug hence a surrogate drug approach was implied in development to minimize the exposure of the drug to people who are testing it for taste evaluation in the early phase of development.

In this approach to access bitterness, few surrogates were used for initial screening, and then once a surrogate is identified, the surrogate is replaced with the main active or test API. Based on a literature search we identified a couple of actives that are less toxic, safe, and which can be evaluated for their bitterness in comparison to Atomoxetine.

TABLE 2

Potential surrogate compounds

| S. No. | Compound | Batch No | Manufacturer/Supplier |
|---|---|---|---|
| 1 | Caffeine Anhydrous | NCE/211203 | Sunpure Extracts |
| 2 | Quinine HCl Dihydrate | G805D-YD | Tokyo Chemical Industry |
| 3 | Acetaminophen | — | Sigma Aldrich |

The study was conducted using only water and a base composition as vehicles for the drug substance and the potential surrogate compounds for comparison.

Four batches with water and four batches with base composition were evaluated for their taste comparison to Atomoxetine.

TABLE 3

Composition of drug substance and potential surrogate solutions

| S. No | Compound | Vehicle | Concentration (mg/mL) | Vehicle | Concentration (mg/mL) |
|---|---|---|---|---|---|
| 1. | Atomoxetine HCl | Purified water | 4.0 | Base composition with flavors | 4.0 |
| 2 | Acetaminophen | water | 4.0 | | 4.0 |
| 3 | Caffeine | | 4.0 | | 4.0 |
| 4 | Quinine HCl | | 4.0 | | 4.0 |

TABLE 4

Base composition

| Ingredients | mg/mL | gm/100 mL |
|---|---|---|
| Propylene glycol | 114 | 11.4 |
| Sucralose | 4.72 | 0.47 |
| water | q.s to 1 mL | to 100 mL |
| pH adjusted to 4.5 | | |

Threshold of bitterness concentration of Atomoxetine HCl and potential surrogates was determined by a panel of a minimum four volunteers. The volunteers were asked to hold ~2 mL of Atomoxetine HCl and later surrogate solution samples in their mouth for 10 seconds before spitting it out.

The volunteers were then asked to rate the bitterness of the compounds on the bitterness scale as given below in Table 5.

To avoid bias between samples, the volunteers were asked to rinse their oral cavity with water at least five times, and a minimum gap of 10 minutes was maintained between two successive taste evaluations.

TABLE 5

Bitterness Scale

| Tasteless | Slightly bitter | Lightly bitter | Moderately bitter | Strongly bitter |
|---|---|---|---|---|
| 0 | 1 | 2 | 3 | 4 |

The volunteers were asked to identify compounds that have a taste similar to Atomoxetine HCl solution for its bitterness. Based on the feedback of volunteers on the similarity in taste to Atomoxetine HCl and the individual rankings, the surrogate compound was selected for further screening.

TABLE 6

Surrogate identification in base composition

| Volunteer | | | |
|---|---|---|---|
| 001A | 001B | 001C | 001D |
| Details | | | |
| Atomoxetine + Base Volunteer ratings | Caffeine + Base | Quinine + Base | Acetaminophen + Base |
| 2 | 3 | 2 | 3 | 1 |
| 3 | 3 | 2 | 3 | 0 |
| 4 | 3.5 | 2 | 4 | 1 |

TABLE 7

Surrogate identification in water

| Volunteer | | | |
|---|---|---|---|
| 001E | 001F | 001G | 001H |
| Details | | | |
| Atomoxetine + P.water* Volunteer ratings | Caffeine + P.Water | Quinine + P.Water | Acetaminophen + P. water |
| 1 | 3 | 2 | 2 | 2 |
| 2 | 4 | 3 | 4 | 3 |
| 3 | 4 | 2 | 4 | 1 |
| 4 | 4 | 4 | 3 | 2 |

*P.water = purified water.

Based on the above observations, Quinine Hydrochloride was identified as the initial surrogate comparable to atomoxetine bitterness. This compound was used for the initial screening of polymers and solubilizers.

To evaluate the taste masking of the selected surrogate active using various polymers and excipients a base composition as indicated in Table 04 was used. The excipients were used in concentrations as tabulated in Table 8 in the surrogate oral solution using base composition as the vehicle described in Table 4.

TABLE 8

Excipients and their concentrations used for taste masking screening trial

| Sr. No | Excipients and their combinations | Concentration (% w/v) |
|---|---|---|
| 1 | PEG 400 | 2.5, 5, 10 |
| 2 | PEG 6000 | 2.5, 5, 7.5 |
| 3 | Poloxamer 407 | 0.1, 0.25, 0.5 |
| 4 | Polysorbate 80 | 0.1, 0.25, 0.5 |
| 5 | Vit. E TPGS | 0.1, 0.25, 0.5, 1 |
| 6 | PVP-K30 | 1.0, 2.0, 3.0 |
| 7 | HEC | 1.0, 2.0 |
| 8 | HPC | 1.0, 2.0 |
| 9 | CMC Na | 1.0, 2.0 |
| 10. | HPMC/Hypromellose | 1.0, 2.0 |
| 11. | PVA | 1.25, 0.5 |

Brief manufacturing process:

Amounts of quinine hydrochloride dihydrate, propylene glycol, and sucralose required to prepare 800 mL of the surrogate oral solution was weighed using a calibrated weighing balance.

In purified water, the weighed quantities of quinine hydrochloride dihydrate, propylene glycol, and sucralose were added and stirred to form a clear solution.

The pH of the solution was adjusted with O-phosphoric acid to achieve a pH between 4-5.

This surrogate oral solution was used to prepare ~50 mL of each oral solution with excipients and at concentrations as mentioned in the Tables 10A and 10B.

The compositions were evaluated for taste using the bitterness scale of Table 5.

TABLE 10A

Composition of Screening formulations using Quinine sulphate as the surrogate drug.

| Sr. No. | Name of Ingredient | 002A1 % w/v | 002A2 % w/v | 002A3 % w/v | 002B1 % w/v | 002B2 % w/v | 002B3 % w/v | 002C1 % w/v |
|---|---|---|---|---|---|---|---|---|
| 1 | Quinine HCl Dihydrate | 0.40 | 0.40 | 0.40 | 0.40 | 0.40 | 0.40 | 0.40 |
| 2 | Propylene Glycol | 11.41 | 11.41 | 11.41 | 11.41 | 11.41 | 11.41 | 11.41 |
| 3 | Sucralose | 0.47 | 0.47 | 0.47 | 0.47 | 0.47 | 0.47 | 0.47 |
| 4 | O-phosphoric acid 85% | 0.025 | 0.025 | 0.025 | 0.025 | 0.025 | 0.025 | 0.025 |
| 5 | PEG 400 | 2.50 | 5.00 | 10.00 | — | — | — | — |
| 6 | PEG 6000 | — | — | — | 2.50 | 5.00 | 7.50 | — |
| 7 | Poloxamer 407 | — | — | — | — | — | — | 0.50 |
| 8 | Polysorbate 80 | — | — | — | — | — | — | — |
| 9 | Vitamin E TPGS | — | — | — | — | — | — | — |
| 10 | Purified Water | Q.S. | Q.S. | Q.S. | Q.S. | Q.S. | Q.S. | Q.S. |

Abbreviations: PEG: Polyethylene glycol, TPGS: D-α-Tocopherol Polyethylene Glycol Succinate

TABLE 10B

Composition of Screening formulations using Quinine sulphate as the surrogate drug.

| Sr. No | Name of Ingredient | 002C2 % w/v | 002C3 % w/v | 002D1 % w/v | 002D2 % w/v | 002D3 % w/v | 002E1 % w/v | 002E2 % w/v | 002E3 % w/v |
|---|---|---|---|---|---|---|---|---|---|
| 1 | Quinine HCl Dihydrate | 0.40 | 0.40 | 0.40 | 0.40 | 0.40 | 0.40 | 0.40 | 0.40 |
| 2 | Propylene Glycol | 11.41 | 11.41 | 11.41 | 11.41 | 11.41 | 11.41 | 11.41 | 11.41 |
| 3 | Sucralose | 0.47 | 0.47 | 0.47 | 0.47 | 0.47 | 0.47 | 0.47 | 0.47 |
| 1 | O-phosphoric acid 85% | 0.025 | 0.025 | 0.025 | 0.025 | 0.025 | 0.025 | 0.025 | 0.025 |
| 5 | PEG 400 | — | — | 0.10 | 0.25 | 0.50 | — | — | — |
| 6 | PEG 6000 | — | — | — | — | — | — | — | — |
| 7 | Poloxamer 407 | 1.00 | 2.00 | — | — | — | — | — | — |
| 8 | Polysorbate 80 | — | — | 0.10 | 0.25 | 0.50 | — | — | — |
| 9 | Vitamin E TPGS | — | — | — | — | — | 0.10 | 0.25 | 10.50 |
| 10 | Purified Water | Q.S. | Q.S. | Q.S. | Q.S. | Q.S. | Q.S. | Q.S. | Q.S. |

Abbreviations: PEG: Polyethylene glycol, TPGS: D-α-Tocopherol Polyethylene Glycol Succinate

TABLE 11A

Composition of Screening formulations using Quinine sulphate as the surrogate drug

| Sr. No. | Name of Ingredient | 002F1 % w/v | 002F2 % w/v | 002F3 % w/v | 002G1 % w/v | 002G2 % w/v | 002H1 % w/v |
|---|---|---|---|---|---|---|---|
| 1 | Quinine HCl Dihydrate | 0.40 | 0.40 | 0.40 | 0.40 | 0.40 | 0.40 |
| 2 | Propylene Glycol | 11.41 | 11.41 | 11.41 | 11.41 | 11.41 | 11.41 |
| 3 | Sucralose | 0.47 | 0.47 | 0.47 | 0.47 | 0.47 | 0.47 |
| 4 | O-phosphoric acid 85% | 0.025 | 0.025 | 0.025 | 0.025 | 0.025 | 0.025 |
| 5 | PVP K30 | 1.00 | 2.00 | 3.00 | — | — | — |
| 6 | Hydroxy Ethyl cellulose (HEC) | — | — | — | 1.0 | 2.0 | — |
| 7 | Hydroxy Propyl Cellulose (HPC) | — | — | — | — | — | 1.0 |
| 8 | HPMC | | | | | | |
| 9 | PVA | | | | | | |
| 10 | Purified Water | Q.S. | Q.S. | Q.S. | Q.S. | Q.S. | Q.S. |

Abbreviations: PVP: Polyvinyl Pyrrolidone, HEC: Hydroxy Ethyl Cellulose, HPC: Hydroxy Propyl Cellulose, HPMC: Hydroxy Propyl Methyl Cellulose, PVA: Polyvinyl Acetate

TABLE 11B

Composition of Screening formulations using Quinine sulphate as the surrogate drug

| Sr. No. | Name of Ingredient | 002H2 % w/v | 002I1 % w/v | 002I2 % w/v | 002J1 % w/v | 002J2 % w/v |
|---|---|---|---|---|---|---|
| 1 | Quinine HCl Dihydrate | 0.40 | 0.40 | 0.40 | 0.40 | 0.40 |
| 2 | Propylene Glycol | 11.41 | 11.41 | 11.41 | 11.41 | 11.41 |
| 3 | Sucralose | 0.47 | 0.47 | 0.47 | 0.47 | 0.47 |
| 4 | O-phosphoric acid 85% | 0.025 | 0.025 | 0.025 | 0.025 | 0.025 |
| 5 | PVP K30 | — | — | — | — | — |
| 6 | Hydroxy Ethyl cellulose (HEC) | — | — | — | — | — |
| 7 | Hydroxy Propyl Cellulose (HPC) | 2.0 | — | — | — | — |
| 8 | HPMC | | 1.0 | 2.0 | | |
| 9 | PVA | | | | 1.25 | 0.5 |
| 10 | Purified Water | Q.S. | Q.S. | Q.S. | Q.S. | Q.S. |

Abbreviations: PVP: Polyvinyl Pyrrolidone, HEC: Hydroxy Ethyl Cellulose, HPC: Hydroxy Propyl Cellulose, HPMC: Hydroxy Propyl Methyl Cellulose, PVA: Polyvinyl Acetate To evaluate the organoleptic properties in a more discriminating way, the batches with the higher concentrations of polymers/surfactants were evaluated. In this way, the concentrated drug solution comes into direct contact with the sensory taste buds. The results of the organoleptic evaluation based on the bitterness scale are as tabulated in Tables 12A and 12B.

TABLE 12A

Ratings Given by volunteers for all formulations based on bitterness

| Volunteer | 002A3 PEG 400 | 002B3 PEG 6000 | 002C3 Poloxamer 407 | 002D3 Tween 80 | 002E3 Vitamin E TPGS |
|---|---|---|---|---|---|
| 1 | 2 | 4 | 4 | 4 | 1 |
| 2 | 2 | 4 | 4 | 4 | 1 |
| 3 | 2.5 | 4 | 4 | 4 | 1.5 |
| Mean | 2.2 | 4.0 | 4.0 | 4.0 | 1.2 |

TABLE 12B

Ratings Given by volunteers for all formulations based on bitterness

| Volunteer | 002F3 PVP K30 | 002G2 HEC | 002H2 HPC | 002I2 HPMC | 002J2 PVA |
|---|---|---|---|---|---|
| 1 | 4 | 4 | 4 | 4 | 4 |
| 2 | 4 | 4 | 4 | 4 | 4 |
| 3 | 4 | 4 | 4 | 4 | 4 |
| Mean | 4.0 | 4.0 | 4.0 | 4.0 | 4.0 |

Surprisingly it was found that Vitamin E TPGS had a significant positive taste improvement effect on quinine HCl dihydrate. Therefore, it was decided to further modify the concentration of Vitamin E TPGS as well as to reconfirm the observation using Atomoxetine as an active comparator.

Range Study of Vitamin E TPGS and Atomoxetine

A range finding study of Vitamin E TPGS with Atomoxetine was carried out as below using from 5 mg/mL to 100 mg/mL.

TABLE 13

Composition A

| Ingredients | mg/mL | gm/100 mL |
|---|---|---|
| Atomoxetine | 4 | 0.4 |
| Propylene glycol | 114 | 11.4 |
| Vitamin E TPGS | 5 | 0.5 |
| water | q.s to 1 mL | to 100 mL |
| pH adjusted to 4.5 | | |

TABLE 14

Composition B

| Ingredients | mg/mL | gm/100 mL |
|---|---|---|
| Atomoxetine | 4 | 0.4 |
| Propylene glycol | 114 | 11.4 |
| Vitamin E TPGS | 10 | 1 |
| water | q.s to 1 mL | to 100 mL |
| pH adjusted to 4.5 | | |

TABLE 15

| | Composition C | |
|---|---|---|
| Ingredients | mg/mL | gm/100 mL |
| Atomoxetine | 4 | 0.4 |
| Propylene glycol | 114 | 11.4 |
| Vitamin E TPGS | 25 | 2.5 |
| water | q.s to 1 mL | to 100 mL |
| pH adjusted to 4.5 | | |

TABLE 16

| | Composition D | |
|---|---|---|
| Ingredients | mg/mL | gm/100 mL |
| Atomoxetine | 4 | 0.4 |
| Propylene glycol | 114 | 11.4 |
| Vitamin E TPGS | 50 | 5 |
| Water | q.s to 1 mL | to 100 mL |
| pH adjusted to 4.5 | | |

TABLE 17

| | Composition E | |
|---|---|---|
| Ingredients | mg/mL | gm/100 mL |
| Atomoxetine | 4 | 0.4 |
| Propylene glycol | 114 | 11.4 |
| Vitamin E TPGS | 100 | 10 |
| Water | q.s to 1 mL | to 100 mL |
| pH adjusted to 4.5 | | |

The general process to prepare the above solutions was to first dissolve Vitamin E TPGS in warm water. Once a clear solution was obtained, the API was added under continuous stirring, followed by the addition of propylene glycol, and then the pH was adjusted to 4.5.

TABLE 18

| | Taste evaluation | | | | |
|---|---|---|---|---|---|
| Composition | A | B | C | D | E |
| mg/mL Vitamin E TPGS | 5 | 10 | 25 | 50 | 100 |
| | Volunteer ratings | | | | |
| 1 | 2 | 2 | 2 | 2 | 1 |
| 2 | 3 | 2 | 1 | 2 | 2 |
| 3 | 3 | 2 | 2 | 2 | 2 |
| 4 | 2 | 3 | 2 | 1 | 2 |
| Mean | 2.5 | 2.25 | 1.75 | 1.75 | 1.75 |

Note:
Bitterness scale as per table 5

Taste evaluation was carried out for the above batches, and it was observed that an effective taste masking was achieved at all concentrations of Vitamin E TPGS (5-100 mg/mL). But additional shift in taste was observed beyond 25 mg/mL.

Specifically, it was observed that taste masking was significant from 0.1-50 mg/mL, from 5-25 mg/mL, and from 0.1-25 mg/mL.

Because of the experimental results seen with Vitamin E TPGS and quinine HCl dihydrate, it is expected, that the bitter compounds having similar bitterness to quinine HCl dihydrate can be taste masked with Vitamin E TPGS. It is also expected that other bitter compounds (e.g., more bitter than quinine HCl dihydrate) can be taste masked by combining Vitamin E TPGS with sweeteners and flavoring agents. Some of the commonly used sweeteners and flavors are listed in below in Table 19.

TABLE 19

| Commonly used sweeteners and flavors which can be used with Vitamin E TPGS | | |
|---|---|---|
| Vitamin E TPGS | Sweetener | Flavoring Agent |
| 0.5-50 mg/mL | Sucralose | Cherry Flavor |
| 0.5-50 mg/mL | Sucralose | Orange Flavor |
| 0.5-30 mg/mL | Monoammonium glycyrrhizinate* | Peppermint |
| 0.5-25 mg/mL | Sucralose | Orange + Peppermint |
| 0.5-25 mg/mL | Monoammonium glycyrrhizinate* | Orange + Peppermint |
| 0.5-25 mg/mL | Acesulfame K | Orange + Peppermint |
| 0.5-25 mg/mL | Aspartame | Orange + Peppermint |

*sold as Magnasweet ®.

Vitamin E TPGS Versus Water

To further substantiate the taste masking effect of Vitamin E TPGS, we conducted a simple experiment as below considering the highest target dose of 8 mg/mL for Atomoxetine with water alone.

TABLE 20

| | Composition F | |
|---|---|---|
| Ingredients | mg/mL | gm/100 mL |
| Atomoxetine | 8 | 0.8 |
| water | q.s to 1 mL | to 100 mL |

For composition F, Atomoxetine was dissolved in only water as a control to see how bitterness of active is reduced only with addition of Vitamin E TPGS

TABLE 21

Composition G

| Ingredients | mg/mL | gm/100 mL |
|---|---|---|
| Atomoxetine | 8 | 0.8 |
| Vitamin E TPGS | 25 | 2.5 |
| water | q.s to 1 mL | to 100 mL |

For composition G, Vitamin E TPGS was dissolved in warm water. Once a clear solution was obtained, the API was added under continuous stirring.

A taste evaluation was carried out to compare compositions F and G. The ratings obtained are listed in Table 22.

TABLE 22

Taste evaluation

| Composition/ Volunteers | Composition F [water only] | Composition G [Vitamin E TPGS and water] |
|---|---|---|
| 1 | 4 | 2 |
| 2 | 4 | 1 |
| 3 | 4 | 1 |
| 4 | 3 | 2 |
| 5 | 4 | 2 |
| 6 | 3 | 2 |
| Mean | 3.66 | 1.66 |
|  | strong bitter | slightly bitter |

Note:
Ratings as per Table No. 9

We observed a clear, significant shift in bitterness of the active when mixed only with Vitamin E TPGS. This also concluded the impact of sweeteners and flavor which further enhances the taste of formulation.

Without limiting the scope of invention, the taste masking effect of Vitamin E TPGS is further improved by addition of sweeteners and flavors. One skilled in the Vitamin art can extend this taste masking effect of Vitamin E TPGS to other potential bitter drugs, wherein the taste masking effect of Vitamin E TPGS is potentiated by the addition of sweeteners and flavoring agents.

While not wishing to be bound by theory, it is hypothesized that Vitamin E TPGS may act on G Protein receptors and modulate its response leading to desensitization and leading to inhibition of transmission or activation of taste nerve fibers. In that perspective it is possible to use Vitamin E TPGS as a potential excipient for masking bitter taste of many compounds.

Vitamin E TPGS/Atomoxetine Formulations

Implementation of a taste masking platform to Atomoxetine and drugs of similar bitterness was evaluated in combination with various sweeteners and flavors as exemplified below in Tables 23A-25B.

The following manufacturing process was used for the compositions tabulated below.

1) All the raw materials weighed as per the batch quantities mentioned in the formula composition using calibrated weighing balances.
2) In a beaker containing weighed Propylene Glycol, Methyl paraben was added under continuous stirring at a suitable RPM till it get dissolved. After Methyl Paraben got dissolved completely, Propyl Paraben was added and stirred till clear solution formed.
3) Approximately 60% of the batch quantity of water taken in steam jacketed stainless steel vessel which was previously maintained at 40° C. using a Hot water circulating bath. Weighed quantity of Vitamin E TPGS added to water maintained at 40° C. under continuous stirring at suitable RPM till a clear solution observed. This solution allowed to cool down to room temperature (This step was skipped in composition where Vitamin E TPGS was not used).
4) A weighed quantity of Atomoxetine HCl was added under stirring till a clear solution was formed. The solution from step 2 was added to this solution under continuous stirring till clear solution was observed.
5) Weighed quantities of Preservatives, sweetener(s), and flavor were added (as per table listed below) in a stepwise manner to step 4 under continuous stirring & quantity of Purified water added to form the 90% bulk solution keeping the rest to add after pH adjustment. Stirring continued till a clear solution was observed.
6) The pH of the above step 5 solution was adjusted between 4-5 using 10% w/v solution of O-phosphoric acid (85%) and finally volume of the solution was made up to batch size using Purified water.

TABLE 23A

Qualitative and Quantitative Compositions of Atomoxetine oral solutions

| Sr. No. | Name of Ingredient | 006A % w/v | 006B % w/v | 006C % w/v | 009 % w/v | 010 % w/v |
|---|---|---|---|---|---|---|
| 1 | Atomoxetine HCl | 0.46 | 0.46 | 0.46 | 0.46 | 0.46 |
| 2 | Propylene Glycol | 11.41 | 5.00 | 11.41 | 11.41 | 11.41 |
| 3 | Sucralose | 0.47 | 0.47 | 0.47 | 0.47 | 0.47 |
| 4 | Methyl Paraben | — | — | — | 0.18 | — |
| 5 | Propyl Paraben | — | — | — | 0.02 | — |
| 6 | Sodium Benzoate | — | — | — | 0.09 | 0.09 |
| 7 | Vitamin E TPGS | 1.00 | 1.00 | 1.00 | 1.00 | 1.00 |
| 8 | Peppermint Flavour | 0.08 | 0.08 | 0.08 | 0.08 | 0.08 |
| 9 | Orange Flavour | 0.11 | 0.11 | 0.11 | 0.11 | 0.11 |
| 10 | Raspberry Flavour | — | — | — | — | — |
| 11 | Spearmint Flavour | — | — | — | — | — |
| 12 | Lemon flavour | — | — | — | — | — |
| 13 | Ascorbic acid | — | — | — | — | 0.50 |
| 14 | Purified Water | Q.S. | Q.S. | Q.S. | Q.S. | Q.S. |
| 15 | O-phosphoric acid 85% | To adjust pH between 4-5 | | | | |

TABLE 23B

Qualitative and Quantitative Compositions of Atomoxetine oral solutions

| Sr. No. | Name of Ingredient | 011 % w/v | 012A % w/v | 012B % w/v | 012C % w/v |
|---|---|---|---|---|---|
| 1 | Atomoxetine HCl | 0.46 | 0.46 | 0.46 | 0.46 |
| 2 | Propylene Glycol | 11.41 | 11.41 | 11.41 | 11.41 |
| 3 | Sucralose | 0.47 | 0.47 | 0.47 | 0.47 |
| 4 | Methyl Paraben | — | — | — | — |
| 5 | Propyl Paraben | — | — | — | — |
| 6 | Sodium Benzoate | 0.09 | 0.09 | 0.09 | 0.09 |
| 7 | Vitamin E TPGS | — | 1.00 | 1.00 | 1.00 |
| 8 | Peppermint Flavour | 0.08 | — | — | — |
| 9 | Orange Flavour | 0.11 | NA | 0.11 | NA |
| 10 | Raspberry Flavour | — | 0.10 | NA | NA |
| 11 | Spearmint Flavour | — | NA | 0.08 | 0.08 |
| 12 | Lemon flavour | — | — | — | 0.10 |
| 13 | Ascorbic acid | 0.50 | — | — | — |
| 14 | Purified Water | Q.S. | Q.S. | Q.S. | Q.S. |
| 15 | O-phosphoric acid 85% | To adjust pH between 4-5 | | | |

TABLE 24A

Qualitative and Quantitative Compositions of Atomoxetine oral solutions

| Sr. No. | Name of Ingredient | 012D % w/v | 012E % w/v | 012F % w/v | 012G % w/v |
|---|---|---|---|---|---|
| 1 | Atomoxetine HCL | 0.46 | 0.46 | 0.46 | 0.46 |
| 2 | Propylene Glycol | 11.41 | 11.41 | 11.41 | 11.41 |
| 3 | Sucralose | 0.47 | 0.47 | 0.47 | 0.47 |
| 4 | Sorbitol | — | — | — | — |
| 5 | Sodium Benzoate | 0.09 | 0.09 | 0.09 | 0.09 |
| 6 | Vitamin E TPGS | 1.00 | 1.00 | 1.00 | 1.00 |
| 7 | Peppermint Flavour | — | — | — | — |
| 8 | Orange Flavour | — | — | — | — |
| 9 | Bubble gum Flavour | 0.10 | — | — | — |
| 10 | Cherry flavour | — | 0.10 | — | — |
| 11 | Mix berry Flavour | — | — | 0.10 | — |
| 12 | Mafco Magnasweet | — | — | — | 0.30 |
| 13 | HP-beta Cyclodextrin | — | — | — | — |
| 14 | Purified Water | Q.S. | Q.S. | Q.S. | Q.S. |
| 15 | O-phosphoric acid 85% | To adjust pH between 4-5 | | | |

TABLE 24B

Qualitative and Quantitative Compositions of Atomoxetine oral solutions

| Sr. No. | Name of Ingredient | 012H % w/v | 013 % w/v | 014C % w/v |
|---|---|---|---|---|
| 1 | Atomoxetine HCL | 0.46 | 0.46 | 0.46 |
| 2 | Propylene Glycol | 11.41 | 11.41 | 5.00 |
| 3 | Sucralose | 0.65 | 0.47 | 0.47 |
| 4 | Sorbitol | — | — | 7.50 |
| 5 | Sodium Benzoate | 0.09 | 0.09 | 0.09 |
| 6 | Vitamin E TPGS | 1.00 | — | 1.00 |
| 7 | Peppermint Flavour | — | 0.08 | 0.08 |
| 8 | Orange Flavour | — | 0.11 | 0.11 |
| 9 | Bubble gum Flavour | — | — | — |
| 10 | Cherry flavour | — | — | — |
| 11 | Mix berry Flavour | — | — | — |
| 12 | Mafco Magnasweet | — | — | — |
| 13 | HP-beta Cyclodextrin | — | 5.0 | — |
| 14 | Purified Water | Q.S. | Q.S. | Q.S. |
| 15 | O-phosphoric acid 85% | To adjust pH between 4-5 | | |

TABLE 25A

Qualitative and Quantitative Compositions of Atomoxetine oral solutions different trials

| Sr. No. | Name of Ingredient | 014D % w/v | 015A % w/v | 015B % w/v | 015C % w/v |
|---|---|---|---|---|---|
| 1 | Atomoxetine HCl | 0.46 | 0.46 | 0.46 | 0.46 |
| 2 | Propylene Glycol | 5.00 | 5.00 | 5.00 | 5.00 |
| 3 | Glycerol | — | 7.50 | 7.50 | 7.50 |
| 3 | Sucralose | 0.65 | 0.47 | 0.65 | 0.47 |
| 4 | Sorbitol | 7.50 | — | — | — |
| 5 | Methyl Paraben | — | — | — | — |
| 6 | Propyl Paraben | — | — | — | — |
| 7 | Sodium Benzoate | 0.09 | 0.09 | 0.09 | 0.09 |
| 8 | Vitamin E TPGS | 1.00 | — | — | 1.00 |
| 9 | HP B Cyclodextrin | — | — | — | — |
| 10 | Peppermint Flavour | 0.08 | 0.08 | 0.08 | 0.08 |
| 11 | Orange Flavour | 0.11 | 0.11 | 0.11 | 0.11 |
| 12 | Mafco Magnasweet 186 | — | — | — | — |
| 13 | Purified Water | Q.S. | Q.S. | Q.S. | Q.S. |
| 14 | O-phosphoric acid 85% | To adjust pH between 4-5 | | | |

TABLE 25B

Qualitative and Quantitative Compositions of Atomoxetine oral solutions different trials

| Sr. No. | Name of Ingredient | 015D % w/v | 017 % w/v | 018 % w/v |
|---|---|---|---|---|
| 1 | Atomoxetine HCl | 0.46 | 0.46 | 0.46 |
| 2 | Propylene Glycol | 5.00 | 11.41 | 11.41 |
| 3 | Glycerol | 7.50 | — | — |
| 3 | Sucralose | 0.65 | 0.47 | 0.47 |
| 4 | Sorbitol | — | — | — |
| 5 | Methyl Paraben | — | 0.18 | 0.18 |
| 6 | Propyl Paraben | — | 0.02 | 0.02 |
| 7 | Sodium Benzoate | 0.09 | 0.09 | 0.09 |
| 8 | Vitamin E TPGS | 1.00 | — | 1.00 |
| 9 | HP B Cyclodextrin | — | 10.00 | — |
| 10 | Peppermint Flavour | 0.08 | 0.08 | 0.08 |
| 11 | Orange Flavour | 0.11 | 0.11 | 0.11 |
| 12 | Mafco Magnasweet 186 | — | — | 0.30 |
| 13 | Purified Water | Q.S. | Q.S. | Q.S. |
| 14 | O-phosphoric acid 85% | To adjust pH between 4-5 | | |

The formulations in Tables 23A-25B were evaluated for organoleptic properties by a pool of people. The results are shown below in Tables 26A-27B.

TABLE 26A

Result for organoleptic property evaluation for different formulations

| Volunteer | 006A | 006B | 006C | 009 | 010 | 011 |
|---|---|---|---|---|---|---|
| 1 | 1 | 2.5 | 1 | 1 | 3 | 3 |
| 2 | 1 | 3 | 1 | 1 | 3 | 3 |
| 3 | 1 | 2.5 | 1 | 1 | 3 | 3 |
| 4 | 1 | 3 | 1 | 1 | 3 | 3 |
| Average Score | 1 | 2.75 | 1 | 1 | 3 | 3 |

TABLE 26B

Result for organoleptic property evaluation for different formulations

| Volunteer | 012A | 012B | 012C | 012D | 012E | 012F |
|---|---|---|---|---|---|---|
| 1 | 4 | 4 | 4 | 4 | 4 | 4 |
| 2 | 4 | 4 | 4 | 4 | 4 | 4 |
| 3 | 4 | 4 | 4 | 4 | 4 | 4 |
| 4 | 4 | 4 | 4 | 4 | 4 | 4 |
| Average Score | 4 | 4 | 4 | 4 | 4 | 4 |

TABLE 27A

Result for organoleptic property evaluation for different formulations

| Volunteer | 012G | 012H | 014C | 014D | 015A |
|---|---|---|---|---|---|
| 1 | 1 | 1 | 1 | 1 | 4 |
| 2 | 1 | 1 | 1 | 1 | 4 |
| 3 | 1 | 1 | 1 | 1 | 4 |
| 4 | 1 | 1 | 1 | 1 | 4 |
| Average Score | 1 | 1 | 1 | 1 | 4 |

TABLE 27B

Result for organoleptic property evaluation for different formulations

| Volunteer | 015B | 015C | 015D | 017 | 018 |
|---|---|---|---|---|---|
| 1 | 4 | 3 | 2.5 | 1 | 1 |
| 2 | 3.5 | 2.5 | 2 | 1 | 1 |
| 3 | 3 | 2 | 2 | 1 | 1 |
| 4 | 3.5 | 2.5 | 2.5 | 1 | 1 |
| Average Score | 3.5 | 2.5 | 2.25 | 1 | 1 |

The above results show that formulations with Vitamin E TPGS when combined with sweetener and flavor improved the organoleptic properties. Without limiting the scope of the invention, the taste masking effect of Vitamin E TPGS is potentiated by the addition of sweeteners and flavors. One skilled in the art can extend this taste masking effect of Vitamin E TPGS to other potential bitter drugs, wherein the taste masking effect of Vitamin E TPGS is potentiated by the addition of sweeteners and flavors.

Prototype Stability:

The prototype of a promising composition was charged on stability under RT and accelerated stress conditions. The compositions of the products used for the stability study is listed below in Table 28.

TABLE 28

Compositions of Prototype formulations tested for stability

| S. No. | Name of the Ingredient | 009 % w/v | 022 % w/v | 023 % w/v |
|---|---|---|---|---|
| 1 | Atomoxetine HCl | 0.46 | 0.46 | 0.46 |
| 2 | Propylene Glycol | 11.41 | 5.000 | 5.000 |
| 3 | Methyl Paraben | 0.18 | 0.180 | 0.180 |
| 4 | Propyl Paraben | 0.02 | 0.020 | 0.020 |
| 5 | Sucralose | 0.47 | 0.472 | 0.472 |
| 6 | Sodium Benzoate | 0.09 | 0.090 | 0.090 |
| 7 | Sorbitol (Neosorb 70/70 B) | — | 7.500 | 7.500 |
| 8 | Peppermint Flavour (Kerry) | 0.08 | — | — |
|  | Peppermint Flavour (Givaudan) | — | 0.078 | 0.078 |
| 9 | Orange Flavour | 0.11 | 0.110 | 0.110 |
| 10 | Vitamin E TPGS | 1.00 | NA | 1.00 |
| 11 | O-phosphoric acid 85% | 0.03 | 0.025 | 0.025 |
| 12 | Purified Water | q.s to 100% | q.s to 100% | q.s to 100% |

The stability data shows that the prototype formulations have a very good stability profile. This makes the prototype compositions suitable for commercial applications. The results of the prototype representative batches are tabulated in tables 29-31.

TABLE 29

Stability data for Prototype composition 09

| Product Name | Atomoxetine Oral Solution 4 mg/mL |
|---|---|
| Strength | 4 mg/mL |
| Batch Number | 009 |
| Sample Orientation | Upright |
| Packaging | 8 oz HDPE (240 mL) HDPE bottle with 24 mm CRC |

| | | 60° C. | | 40° C./75% RH | |
|---|---|---|---|---|---|
| Test | Initial | 15 Days | 1 Month | 2 Months | 3 Months |
| pH | 4.742 | 4.734 | 4.697 | 4.729 | 4.664 |
| Assay (By UV %) | 97.5 | 95.7 | 98.2 | 98.4 | 97.8 |

TABLE 29-continued

| Atomoxetine Related Compound-A | ND | ND | ND | ND | ND |
|---|---|---|---|---|---|
| Unknown Impurity RRT 0.46/0.47 | BQL | BQL | BQL | BQL | BQL |
| Acid degradant | ND | BQL | ND | BQL | BQL |
| Unknown impurity RRT 0.76/0.77 | BQL | BQL | BQL | BQL | ND |
| Thermal degradant | 0.03 | 0.10 | 0.12 | 0.19 | 0.18 |
| Total Impurities | 0.03 | 0.10 | 0.12 | 0.19 | 0.18 |

| | | 25° C./60% RH | | |
|---|---|---|---|---|
| Test | Initial | 1 Month | 2 Months | 3 Months |
| pH | 4.742 | 4.694 | 4.774 | 4.744 |
| Assay (By UV %) | 97.5 | 99.0 | 97.8 | 96.6 |
| Atomoxetine Related Compound-A | ND | ND | ND | ND |
| Unknown Impurity RRT 0.46/0.47 | BQL | BQL | BQL | BQL |
| Acid degradant | ND | ND | BQL | BQL |
| Unknown impurity RRT 0.76/0.77 | BQL | BQL | BQL | ND |
| Thermal degradant | 0.03 | BQL | 0.05 | 0.07 |
| Total Impurities | 0.03 | 0.00 | 0.05 | 0.07 |

BQL-Below Quantitation Limit (<0.03%),
ND: Not detected.
All solutions were clear and colorless.

TABLE 30

Stability data for Prototype composition 022

| Product Name | Atomoxetine Oral Solution 4 mg/mL |
|---|---|
| Strength | 4 mg/mL |
| Batch Number | 022 |
| Sample Orientation | Upright |
| Packaging | 8 oz HDPE (240 mL) HDPE bottle with 24 mm CRC |

| | | 60° C. | | 40° C./75% RH | |
|---|---|---|---|---|---|
| Test | Initial | 15 Days | 1 Month | 2 Months | 3 Months |
| pH | 4.866 | 4.803 | 4.853 | 4.849 | 4.867 |
| Assay (By UV %) | 98.3 | 96.6 | 97.8 | 95.3 | 95.1 |
| Atomoxetine Related Compound-A | ND | ND | ND | ND | ND |
| Unknown Impurity RRT 0.46/0.47 | ND | BQL | BQL | BQL | BQL |
| Acid degradant | ND | BQL | BQL | BQL | BQL |
| Unknown impurity RRT 0.76/0.77 | BQL | BQL | BQL | BQL | BQL |
| Thermal degradant | ND | ND | ND | ND | ND |
| Total Impurities | 0.00 | 0.00 | 0.00 | 0.00 | 0.00 |

| | | 25° C./60% RH | | |
|---|---|---|---|---|
| Test | Initial | 1 Month | 2 Months | 3 Months |
| pH | 4.866 | 4.820 | 4.822 | 4.881 |
| Assay (By UV %) | 98.3 | 94.2 | 93.4 | 95.2 |
| Atomoxetine Related Compound-A | ND | ND | ND | ND |
| Unknown Impurity RRT 0.46/0.47 | ND | BQL | BQL | BQL |

TABLE 30-continued

| | | | | |
|---|---|---|---|---|
| Acid degradant | ND | BQL | BQL | BQL |
| Unknown impurity RRT 0.76/0.77 | BQL | BQL | ND | BQL |
| Thermal degradant | ND | ND | ND | ND |
| Total Impurities | 0.00 | 0.00 | 0.00 | 0.00 |

BQL-Below Quantitation Limit (<0.03%),
ND: Not detected.
All solutions were clear and colorless.

TABLE 31

Stability data for Prototype composition 023

| Product Name | Atomoxetine Oral Solution 4 mg/mL |
|---|---|
| Strength | 4 mg/mL |
| Batch Number | 023 |
| Sample Orientation | Upright |
| Packaging | 8 oz HDPE (240 mL) HDPE bottle with 24 mm CRC |

| | | 40° C./75% RH | | | |
|---|---|---|---|---|---|
| Test | 60° C. Initial | 15 Days | 1 Month | 2 Months | 3 Months |
| pH | 4.790 | 4.780 | 4.820 | 4.746 | 4.768 |
| Assay (By UV %) | 100.6 | 98.5 | 99.7 | 98.0 | 98.1 |
| Related substances | | | | | |
| Atomoxetine Related Compound-A | ND | ND | IND | ND | ND |
| Unknown Impurity RRT 0.46/0.47 | ND | BQL | BQL | BQL | BQL |
| Acid degradant | ND | BQL | BQL | BQL | BQL |
| Unknown impurity RRT 0.76/0.77 | BQL | BQL | ND | IND | ND |
| Thermal degradant | ND | 0.13 | 0.13 | 0.29 | 0.30 |
| Total Impurities | 0.00 | 0.13 | 0.13 | 0.29 | 0.30 |

| | 25° C./60% RH | | | |
|---|---|---|---|---|
| Test | Initial | 1 Month | 2 Months | 3 Months |
| pH | 4.790 | 4.839 | 4.812 | 4.828 |
| Assay (By UV %) | 100.6 | 99.2 | 97.8 | 97.8 |
| Related substances | | | | |
| Atomoxetine Related Compound-A | ND | BQL | ND | ND |
| Unknown Impurity RRT 0.46/0.47 | ND | BQL | BQL | BQL |
| Acid degradant | ND | BQL | BQL | BQL |
| Unknown impurity RRT 0.76/0.77 | BQL | BQL | ND | ND |
| Thermal degradant | ND | BQL | 0.05 | 0.08 |
| Total Impurities | 0.00 | 0.00 | 0.5 | 0.08 |

BQL-Below Quantitation Limit (<0.03%),
ND: Not detected.
All solutions were clear and colorless.

Interestingly a heat-induced unknown impurity at RRT 0.81 is observed in the formulation containing Vitamin E TPGS. This impurity was absent in one to one API. In Vitamin E TPGS compatibility studies, however, it was only seen when all excipients were together. Hence multiple batches were taken by removing individual excipients to identify a route cause. Upon investigation, it was observed that Sodium Benzoate together with Vitamin E TPGS and other excipients led to the formation of unknown impurity at high temperatures. Based on this, Sodium Benzoate was removed from the composition.

TABLE 32

Improved composition of Atomoxetine without Sodium Benzoate

| | | | Batch Number | #41 |
|---|---|---|---|---|
| S. No. | Name of the Ingredient (with grade) | Specification | Actual quantity (mg/mL) | Quantity (% w/v) |
| 1 | Atomoxetine* | USP | 8.00 | 0.800 |
| 2 | Vit. E TPGS | NF | 25.00 | 2.50 |
| 3 | Propylene Glycol | USP/BP/Ph. Eur. | 114.08 | 11.408 |
| 4 | Methyl Paraben | BP/Ph. Eur./NF | 1.80 | 0.180 |
| 5 | Propyl Paraben | USPNF BP/Ph. Eur. | 0.20 | 0.020 |
| 6 | Sucralose | USP-NF/Ph.Eur. | 4.72 | 0.472 |
| 7 | Peppermint Flavour | IH | 0.78 | 0.078 |
| 8 | Orange Flavour | IH | 1.10 | 0.110 |
| 9 | O-Phosphoric acid | /Ph.Eur./NF/JP | q.s to adjust pH between 4-5 | |
| 10 | Purified Water | N/A | q.s to 1 mL | q.s to 100% |

TABLE 33

Stability of the composition without Sodium Benzoate

| | | #41 | | |
|---|---|---|---|---|
| | | Initial | 60° C. 2 W | 60° C. 4 W |
| Assay (By HPLC %) | | 90.5 | 91.3 | 93.7 |
| pH | | 4.3 | 4.7 | 4.4 |
| Related substances | RRT | | | |
| Atomoxetine Related Compound-A | 0.29 | ND | ND | ND |
| Unknown Impurity | 0.46/0.47 | BQL | BQL | BQL |
| Impurities (Acid degradant) | 0.5 | BQL | 0.03 | 0.09 |
| Unknown impurity | 0.76/0.77 | BQL | ND | BQL |
| Impurities (Thermal degradant) | 0.81 | BQL | BQL | ND |
| Unknown Impurity | 0.90 | BQL | ND | ND |
| Total Impurities | NA | 0.00 | 0.03 | 0.09 |

BQL: Below Quantitation level,
ND: Not detected.

In view of the above, the absence of Sodium Benzoate in the Atomoxetine-Vitamin E TPGS composition was found to be beneficial. Based on these observations, further optimization of Vitamin E TPGS, flavors, and sweeteners was carried out to cover both 4 mg/mL and 8 mg/mL strength for Atomoxetine as exemplified in below table.

TABLE 34

Taste masked composition: Atomoxetine 4 mg/mL

| S. No. | Name of the Ingredient (with grade) | Specification | Batch Number #074 Orange + Peppermint | | Batch Number #072 Cherry flavor | |
|---|---|---|---|---|---|---|
| | | | Actual quantity (mg/mL) | Quantity (% w/v) | Actual quantity (mg/mL) | Quantity (% w/v) |
| 1 | Atomoxetine* | USP | 4.00 | 0.400 | 4.00 | 0.400 |
| 2 | Vit. E TPGS | NF | 12.50 | 1.250 | 12.50 | 1.250 |
| 3 | Propylene Glycol | USP/BP/Ph. Eur. | 114.08 | 11.408 | 114.08 | 11.408 |
| 4 | Methyl Paraben | BP/Ph. Eur./NF | 1.80 | 0.180 | 1.80 | 0.180 |
| 5 | Propyl Paraben | USPNF BP/Ph. Eur. | 0.20 | 0.020 | 0.20 | 0.020 |
| 6 | Sucralose | USP-NF/Ph.Eur. | 4.72 | 0.472 | 4.72 | 0.472 |
| 7 | Cherry flavour | IH | — | — | 2.00 | 0.200 |
| 8 | Peppermint Flavour | IH | 0.78 | 0.078 | — | — |
| 9 | Orange Flavour | IH | 1.10 | 0.110 | — | — |
| 10 | O-Phosphoric acid | /Ph.Eur./NF/JP | q.s to adjust pH between 4-5 | | | |
| 11 | Purified Water | N/A | q.s to 1 ML | q.s to 100% | q.s to 1 mL | q.s to 100% |

Atomoxetine HCL equivalent to Atomoxetine 4 mg/ml

TABLE 35

Taste masked composition: Atomoxetine 8 mg/mL

| S. No. | Name of the Ingredient (with grade) | Specification | Batch Number 079 Orange + Peppermint | | Batch Number 077 Cherry flavor | |
|---|---|---|---|---|---|---|
| | | | Actual quantity (mg/mL) | Quantity (% w/v) | Actual quantity (mg/mL) | Quantity (% w/v) |
| 1 | Atomoxetine* | USP | 8.00 | 0.800 | 8.00 | 0.800 |
| 2 | Vit. E TPGS | NF | 25.00 | 2.50 | 25.00 | 2.50 |
| 3 | Propylene Glycol | USP/BP/Ph. Eur. | 114.08 | 11.408 | 114.08 | 11.408 |
| 4 | Methyl Paraben | BP/Ph. Eur./NF | 1.80 | 0.180 | 1.80 | 0.180 |
| 5 | Propyl Paraben | USPNF BP/Ph. Eur. | 0.20 | 0.020 | 0.20 | 0.020 |
| 6 | Sucralose | USP-NF/Ph.Eur. | 4.72 | 0.472 | 4.72 | 0.472 |
| 7 | Cherry flavour | IH | — | — | 2.00 | 0.200 |
| 8 | Peppermint Flavour | IH | 0.78 | 0.078 | — | — |
| 9 | Orange Flavour | IH | 1.10 | 0.110 | — | — |
| 10 | O-Phosphoric acid | /Ph.Eur./NF/JP | q.s to adjust pH between 4-5 | | | |
| 11 | Purified Water | N/A | q.s to 1 mL | q.s to100% | q.s to 1 mL | q.s to 100% |

Atomoxetine HCL equivalent to Atomoxetine 8 mg/mL

Manufacturing Process

1. Dissolve weighed quantity of Vitamin E TPGS in warm water at 40°-45° C., mix till a clear solution is obtained. Allow the solution to cool at room temperature.
2. Add weighed quantity of Atomoxetine Hydrochloride in step 1 solution under continuous stirring to form a clear solution.
3. Add sucralose in the step 2 solution to form a clear sweet solution of Atomoxetine.
4. In another container dissolve methyl and propyl parabens in propylene glycol to form a clear solution under constant stirring.
5. Transfer solution from step 4 to step 3 to form a clear solution under constant stirring.
6. Adjust the pH of the solution to 4.5 by adding 85% ortho phosphoric acid.
7. Add flavor in the step 3.
8. Fill 240 mL in HDPE bottles and seal it with Child resistant cap.

Taste observations of the final batches are listed in Table 36.

TABLE 36

| Taste evaluation | | | | |
|---|---|---|---|---|
| Composition | 74 | 72 | 79 | 77 |
| Atomoxetine Strength mg/mL | 4 | 4 | 8 | 8 |

TABLE 36-continued

| Flavor | Orange + Peppermint | Cherry | Orange + Peppermint | Cherry |
|---|---|---|---|---|
| Details mg/mL Vitamin E TPGS | 12.5 | 12.5 | 25 | 25 |
| Volunteer ratings | | | | |
| 1 | 2 | 2 | 2 | 2 |
| 2 | 3 | 2 | 1 | 2 |
| 3 | 3 | 2 | 2 | 2 |
| 4 | 2 | 3 | 2 | 1 |
| 5 | 3 | 2 | 3 | 2 |
| 6 | 2 | 1 | 2 | 1 |
| 7 | 2 | 2 | 2 | 2 |
| 8 | 3 | 2 | 3 | 2 |
| 9 | 3 | 2 | 3 | 2 |
| 10 | 2 | 2 | 2 | 3 |
| Mean | 2.50 | 2.00 | 2.20 | 1.90 |

Note:
Taste evaluation rating as per Table No. 9

The taste evaluation of final prototypes concluded that both flavors are acceptable to mask the bitterness along with Vitamin E TPGS.

All references listed herein are individually incorporated herein in their entirety by reference.

Numerous modifications and variations of the invention are possible considering the above teachings. It is therefore to be understood that within the scope of the appended claims, the invention may be practiced otherwise than as specifically described herein.

Embodiments of the Invention are as Follows

1. A palatable oral solution, comprising:
a. a bitter active pharmaceutical ingredient;
b. about 5-50 mg/mL Vitamin E TPGS; and,
c. water.
2. The solution of embodiment 1, comprising:
a. a bitter active pharmaceutical ingredient;
b. about 5-50 mg/mL Vitamin E TPGS;
c. a cosolvent; and,
d. water.
3. The solution of embodiment, comprising:
a. a bitter active pharmaceutical ingredient;
b. about 5-50 mg/mL Vitamin E TPGS;
c. a preservative; and,
d. water.
4. The solution of embodiment, comprising:
a. a bitter active pharmaceutical ingredient;
b. about 5-50 mg/mL Vitamin E TPGS;
c. a sweetener; and,
d. water.
5. The solution of embodiment, comprising:
a. a bitter active pharmaceutical ingredient;
b. about 5-50 mg/mL Vitamin E TPGS;
c. a flavoring agent; and,
d. water.
6. The solution of embodiment, comprising:
a. a bitter active pharmaceutical ingredient;
b. about 5-50 mg/mL Vitamin E TPGS;
c. a cosolvent;
d. a sweetener;
e. a flavoring agent; and,
f. water.
7. The solution of embodiment, comprising:
a. a bitter active pharmaceutical ingredient;
b. about 5-50 mg/mL Vitamin E TPGS;
c. a cosolvent;
d. a preservative;
e. a sweetener;
f. a flavoring agent; and,
g. water.
8. A palatable oral solution, comprising:
a. about 4-8 mg/mL atomoxetine HCl;
b. about 5-50 mg/mL Vitamin E TPGS; and,
c. water.
9. The solution of embodiment 8, comprising:
a. about 4-8 mg/mL atomoxetine HCl;
b. about 12.5-25 mg/mL Vitamin E TPGS; and,
c. water.
10. The solution of embodiment 8, comprising:
a. about 4-8 mg/mL atomoxetine HCl;
b. about 12.5-25 mg/mL Vitamin E TPGS;
c. a cosolvent; and,
d. water.
11. The solution of embodiment 8, comprising:
a. about 4-8 mg/mL atomoxetine HCl;
b. about 12.5-25 mg/mL Vitamin E TPGS;
c. about 25-120 mg/mL of propylene glycol; and,
d. water.
12. The solution of embodiment 8, comprising:
a. about 4-8 mg/mL atomoxetine HCl;
b. about 12.5-25 mg/mL Vitamin E TPGS;
c. a preservative; and,
d. water.
13. The solution of embodiment 8, comprising:
a. about 4-8 mg/mL atomoxetine HCl;
b. about 12.5-25 mg/mL Vitamin E TPGS;
c. a preservative, comprising:
  a. about 1.5-2 mg/mL of methyl paraben; and,
  b. about 0.1-0.4 mg/mL of propyl paraben; and,
d. water.
14. The solution of embodiment 8, comprising:
a. about 4-8 mg/mL atomoxetine HCl;
b. about 12.5-25 mg/mL Vitamin E TPGS;
c. a sweetener; and,
d. water.
15. The solution of embodiment 8, comprising:
a. about 4-8 mg/mL atomoxetine HCl;
b. about 12.5-25 mg/mL Vitamin E TPGS;
c. about 4-6 mg/mL of sucralose; and,
d. water.
16. The solution of embodiment 8, comprising:
a. about 4-8 mg/mL atomoxetine HCl;
b. about 12.5-25 mg/mL Vitamin E TPGS;
c. a flavoring agent; and,
d. water.
17. The solution of embodiment 8, comprising:
a. about 4-8 mg/mL atomoxetine HCl;
b. about 12.5-25 mg/mL Vitamin E TPGS;
c. about 1-3 mg/mL of cherry flavor; and,
d. water.
18. The solution of embodiment 8, comprising:
a. about 4-8 mg/mL atomoxetine HCl;
b. about 12.5-25 mg/mL Vitamin E TPGS;
c. a flavoring agent, comprising:
  a. about 0.5-1.5 mg/mL of orange flavor; and,
  b. about 0.5-1.5 mg/mL of peppermint flavor; and,
d. water.
19. The solution of embodiment 8, comprising:
a. about 4-8 mg/mL atomoxetine HCl;
b. about 12.5-25 mg/mL Vitamin E TPGS;
c. a cosolvent;

d. a sweetener;
e. a flavoring agent; and,
f. water.
20. The solution of embodiment 8, comprising:
a. about 4-8 mg/mL atomoxetine HCl;
b. about 12.5-25 mg/mL Vitamin E TPGS;
c. about 25-120 mg/mL of propylene glycol;
d. about 4-6 mg/mL of sucralose;
e. about 1-3 mg/mL of cherry flavor; and,
f. water.
21. The solution of embodiment 8, comprising:
a. about 4-8 mg/mL atomoxetine HCl;
b. about 12.5-25 mg/mL Vitamin E TPGS;
c. about 25-120 mg/mL of propylene glycol;
d. about 4-6 mg/mL of sucralose;
e. a flavoring agent, comprising:
 a. about 0.5-1.5 mg/mL of orange flavor; and,
 b. about 0.5-1.5 mg/mL of peppermint flavor; and,
f. water.
22. The solution of embodiment 8, comprising:
a. about 4-8 mg/mL atomoxetine HCl;
b. about 12.5-25 mg/mL Vitamin E TPGS;
c. a cosolvent;
d. a preservative;
e. a sweetener;
f. a flavoring agent; and,
g. water.
23. The solution of embodiment 8, comprising:
a. about 4-8 mg/mL atomoxetine HCl;
b. about 12.5-25 mg/mL Vitamin E TPGS;
c. about 25-120 mg/mL of propylene glycol;
d. a preservative, comprising:
 a. about 1.5-2 mg/mL of methyl paraben; and,
 b. about 0.1-0.4 mg/mL of propyl paraben; and,
e. about 4-6 mg/mL of sucralose;
f. about 1-3 mg/mL of cherry flavor; and,
g. water.
24. The solution of embodiment 8, comprising:
a. about 4-8 mg/mL atomoxetine HCl;
b. about 12.5-25 mg/mL Vitamin E TPGS;
c. about 25-120 mg/mL of propylene glycol;
d. a preservative, comprising:
 a. about 1.5-2 mg/mL of methyl paraben; and,
 b. about 0.1-0.4 mg/mL of propyl paraben; and,
e. about 4-6 mg/mL of sucralose;
f. a flavoring agent, comprising:
 a. about 0.5-1.5 mg/mL of orange flavor; and,
 b. about 0.5-1.5 mg/mL of peppermint flavor; and,
g. water.
25. The solution of embodiment 8, comprising:
a. about 4-8 mg/mL atomoxetine HCl;
b. about 12.5-25 mg/mL Vitamin E TPGS;
c. about 114 mg/mL of propylene glycol;
d. a preservative, comprising:
 a. about 1.8 mg/mL of methyl paraben; and,
 b. about 0.2 mg/mL of propyl paraben; and,
e. about 5 mg/mL of sucralose;
f. about 2 mg/mL of cherry flavor; and,
g. water.
26. The solution of embodiment 8, comprising:
a. about 4 mg/mL atomoxetine HCl;
b. about 12.5 mg/mL Vitamin E TPGS;
c. about 114 mg/mL of propylene glycol;
d. a preservative, comprising:
 a. about 1.8 mg/mL of methyl paraben; and,
 b. about 0.2 mg/mL of propyl paraben; and,
e. about 5 mg/mL of sucralose;
f. a flavoring agent, comprising:
 a. about 1.1 mg/mL of orange flavor; and,
 b. about 0.8 mg/mL of peppermint flavor; and,
g. water.
27. The solution of embodiment 8, comprising:
a. about 4 mg/mL atomoxetine HCl;
b. about 12.5 mg/mL Vitamin E TPGS;
c. about 114 mg/mL of propylene glycol;
d. a preservative, comprising:
 a. about 1.8 mg/mL of methyl paraben; and,
 b. about 0.2 mg/mL of propyl paraben; and,
e. about 5 mg/mL of sucralose;
f. about 2 mg/mL of cherry flavor; and,
g. water.
28. The solution of embodiment 8, comprising:
a. about 8 mg/mL atomoxetine HCl;
b. about 25 mg/mL Vitamin E TPGS;
c. about 114 mg/mL of propylene glycol;
d. a preservative, comprising:
 a. about 1.8 mg/mL of methyl paraben; and,
 b. about 0.2 mg/mL of propyl paraben; and,
e. about 5 mg/mL of sucralose;
f. a flavoring agent, comprising:
 a. about 1.1 mg/mL of orange flavor; and,
 b. about 0.8 mg/mL of peppermint flavor; and,
g. water.
29. The solution of embodiment 8, comprising:
a. about 8 mg/mL atomoxetine HCl;
b. about 25 mg/mL Vitamin E TPGS;
c. about 114 mg/mL of propylene glycol;
d. a preservative, comprising:
 a. about 1.8 mg/mL of methyl paraben; and,
 b. about 0.2 mg/mL of propyl paraben; and,
e. about 5 mg/mL of sucralose;
f. about 2 mg/mL of cherry flavor; and,
g. water.
30. The solution of any one of embodiments 1-29, further comprising a pH adjusting agent.
31. The solution of any one of embodiments 1-31, wherein the pH adjusting agent is O-phosphoric acid.
32. The solution of any one of embodiments 1-31, wherein the solution has a pH of 4 to 8; preferably, a pH of 4 to 7, more preferably, a pH of 4 to 6, and even more preferably pH of 4 to 5

Taste Masking of Additional Bitter Active Pharmaceutical Ingredients

The use of vitamin E TPGS as a taste masking agent of bitter active pharmaceutical ingredients is illustrated with additional examples as provided below. The selection of bitter active pharmaceutical ingredients is provided in Table 37.

TABLE 37

| Bitter active pharmaceutical ingredients | |
|---|---|
| No. | Bitter active pharmaceutical ingredient |
| 1 | Ranitidine hydrochloride |
| 2 | Quinine |
| 3 | Paracetamol |
| 4 | Colchicine |
| 5 | Cetirizine hydrochloride |
| 6 | Levocetirizine hydrochloride |
| 7 | Ibuprofen |
| 8 | Erythromycin |

TABLE 37-continued

| Bitter active pharmaceutical ingredients | |
|---|---|
| No. | Bitter active pharmaceutical ingredient |
| 9 | Ciprofloxacin |
| 10 | Chlorpheniramine maleate |
| 11 | Aspirin |
| 12 | Dextromethorphan Hydrobromide |
| 13 | Cinacalcet hydrochloride |

For each selection of bitter active pharmaceutical ingredient, 4 solutions were prepared as presented in Table 38. A first aqueous solution only contained the selected active pharmaceutical ingredient. A second aqueous solution is based on a combination of bitter API and vitamin E TPGS. A third aqueous solution in addition contains sucralose. In a fourth aqueous solution a combination of API, vitamin E TPGS, sucralose sweetener and flavor is used.

TABLE 38

| Preparation schedule | | | | | |
|---|---|---|---|---|---|
| Sample number | Pharmaceutical active ingredient | Vitamin E TPGS | Sweetener (Sucralose) | Flavor (Cherry) | Purified water |
| A | As such | — | — | — | As vehicle |
| B | Melting Vitamin E TPGS and API added. Make up to volume. | — | — | — | As vehicle |
| C | Melting Vitamin E TPGS, API and sucralose added. Make up to volume. | | | — | As vehicle |
| D | Melting Vitamin E TPGS, API, sucralose and flavor added. Make up to volume. | | | | As vehicle |

The preparation of 25 ml aqueous solutions comprising ranitidine hydrochloride as bitter substance, is summarized in Table 39.

TABLE 39

| Ranitidine hydrochloride test solutions | | | | | |
|---|---|---|---|---|---|
| | | | | | Quantity in mg |
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug:Vitamin E TPGS |
| 1 | Ranitidine hydrochloride | 375 | 375 | 375 | 375 | 1:1.66 |
| 2 | Vitamin E TPGS | — | 625 | 625 | 625 | |
| 3 | Sucralose | — | — | 375 | 375 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising quinine as bitter substance, is summarized in Table 40.

TABLE 40

| Quinine test solutions | | | | | |
|---|---|---|---|---|---|
| | | | | | Quantity in mg |
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug:Vitamin E TPGS |
| 1 | Quinine | 50 | 50 | 50 | 50 | 1:12.5 |
| 2 | Vitamin E TPGS | — | 625 | 625 | 625 | |
| 3 | Sucralose | — | — | 50 | 50 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising paracetamol as bitter substance, is summarized in Table 41.

TABLE 41

| Paracetamol test solutions | | | | | |
|---|---|---|---|---|---|
| | | | | | Quantity in mg |
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug:Vitamin E TPGS |
| 1 | Paracetamol | 1500 | 1500 | 1500 | 1500 | 1:0.42 |
| 2 | Vitamin E TPGS | — | 625 | 625 | 625 | |
| 3 | Sucralose | — | — | 1500 | 1500 | — |
| 4 | Cherry flavour | — | — | — | 2 drops | — |
| 5 | Water | QS to 25 ml | QS to 25 ml | QS to 25 ml | QS to 25 ml | — |
| 6 | Sodium hydroxide (0.1N Solution) | QS to dissolve | QS to dissolve | QS to dissolve | QS to dissolve | — |

The preparation of 25 ml aqueous solutions comprising colchicine as bitter substance, is summarized in Table 42.

TABLE 42

| Colchicine test solutions | | | | | |
|---|---|---|---|---|---|
| | | | | | Quantity in mg |
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug:Vitamin E TPGS |
| 1 | Colchicine | 12.5 | 12.5 | 12.5 | 12.5 | 1:50 |
| 2 | Vitamin E TPGS | — | 625 | 625 | 625 | |
| 3 | Sucralose | — | — | 12.5 | 12.5 | — |

TABLE 42-continued

Colchicine test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising cetirizine hydrochloride as bitter substance, is summarized in Table 43.

TABLE 43

Cetirizine hydrochloride test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 1 | Cetirizine Hydrochloride | 25 | 25 | 25 | 25 | 1:25 |
| 2 | Vitamin E TPGS | — | 625 | 625 | 625 | |
| 3 | Sucralose | — | — | 25 | 25 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising levocetirizine hydrochloride as bitter substance, is summarized in Table 44.

TABLE 44

Levocetirizine hydrochloride test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 1 | Levo Cetirizine HCl | 25 | 25 | 25 | 25 | 1:25 |
| 2 | Vitamin E TPGS | — | 625 | 625 | 625 | |
| 3 | Sucralose | — | — | 25 | 25 | — |
| 4 | Cherry flavour | — | — | — | 2 drops | — |

TABLE 44-continued

Levocetirizine hydrochloride test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 5 | Water | QS to 25 ml | QS to 25 ml | QS to 25 ml | QS to 25 ml | — |

The preparation of 25 ml aqueous solutions comprising ibuprofen as bitter substance, is summarized in Table 45.

TABLE 45

Ibuprofen test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 1 | Ibuprofen | 250 | 250 | 250 | 250 | 1:2.5 |
| 2 | Vitamin E TPGS | — | 625 | 625 | 625 | |
| 3 | Sucralose | — | — | 250 | 250 | — |
| 4 | Cherry flavour | — | — | — | 2 drops | — |
| 5 | Water | QS to 25 ml | QS to 25 ml | QS to 25 ml | QS to 25 ml | — |
| 6 | Sodium hydroxide (0.1N Solution) | QS to dissolve | QS to dissolve | QS to dissolve | QS to dissolve | — |

The preparation of 25 ml aqueous solutions comprising erythromycin as bitter substance, is summarized in Table 46.

TABLE 46

Erythromycin test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 1 | Erythromycin | 375 | 375 | 375 | 375 | 1:1.66 |
| 2 | Vitamin E TPGS | — | 625 | 625 | 625 | |
| 3 | Sucralose | — | — | 375 | 375 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising ciprofloxacin as bitter substance, is summarized in Table 47.

TABLE 47

Ciprofloxacin test solutions

| | | Quantity in mg | | | | |
|---|---|---|---|---|---|---|
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
| 1 | Ciprofloxacin | 25 | 25 | 25 | 25 | 01:25 |
| 2 | Vitamin E TPGS | — | 625 | 625 | 625 | |
| 3 | Sucralose | — | — | 25 | 25 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising chlorpheniramine maleate as bitter substance, is summarized in Table 48.

TABLE 48

Chlorpheniramine maleate test solutions

| | | Quantity in mg | | | | |
|---|---|---|---|---|---|---|
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
| 1 | Chlorpheniramine maleate | 50 | 50 | 50 | 50 | 1:12.5 |
| 2 | Vitamin E TPGS | — | 625 | 625 | 625 | |
| 3 | Sucralose | — | — | 50 | 50 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising aspirin as bitter substance, is summarized in Table 49.

TABLE 49

Aspirin test solutions

| | | Quantity in mg | | | | |
|---|---|---|---|---|---|---|
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
| 1 | Aspirin | 50 | 50 | 50 | 50 | 1:12.5 |
| 2 | Vitamin E TPGS | — | 625 | 625 | 625 | |
| 3 | Sucralose | — | — | 50 | 50 | — |
| 4 | Cherry flavour | — | — | — | 2 drops | — |
| 5 | Water | QS to 25 ml | QS to 25 ml | QS to 25 ml | QS to 25 ml | — |

The preparation of 25 ml aqueous solutions comprising dextromethorphan as bitter substance, is summarized in Table 50.

TABLE 50

Dextromethorphan hydrochloride test solutions

| | | Quantity in mg | | | | |
|---|---|---|---|---|---|---|
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
| 1 | Dextromethorphan Hydrobromide | 50 | 50 | 50 | 50 | 1:12.5 |
| 2 | Vitamin E TPGS | — | 625 | 625 | 625 | |
| 3 | Sucralose | — | — | 50 | 50 | — |
| 4 | Cherry flavour | — | — | — | 2 drops | — |
| 5 | Ethanol | 10 ml | 10 ml | 10 ml | 10 ml | — |
| 6 | Water | QS to 25 ml | QS to 25 ml | QS to 25 ml | QS to 25 ml | — |

The preparation of 25 ml aqueous solutions comprising cinacalcet as bitter substance, is summarized in Table 51.

TABLE 51

Cinacalcet hydrochloride test solutions

| | | Quantity in mg | | | | |
|---|---|---|---|---|---|---|
| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
| 1 | Cinacalcet hydrochloride | 100 | 100 | 100 | 100 | 1:6.25 |
| 2 | Vitamin E TPGS | | 625 | 625 | 625 | |

TABLE 51-continued

Cinacalcet hydrochloride test solutions

Quantity in mg

| No. | Ingredients | Solution A Drug solution | Solution B Drug sample + Vitamin E TPGS | Solution C Drug sample + Vitamin E TPGS + Sucralose | Solution D Drug sample + Vitamin E TPGS + Sucralose + Cherry Flavour | Drug: Vitamin E TPGS |
|---|---|---|---|---|---|---|
| 3 | Sucralose | | | 100 | 100 | |
| 4 | Cherry flavour | | | | 2 drops | |
| 5 | Water | QS to 25 ml | QS to 25 ml | QS to 25 ml | QS to 25 ml | |

A numerical scale was used to record the results of taste screenings, as presented in Table 52.

TABLE 52

Taste scale used for formulation screening
Organoleptic properties: Taste

| Taste scale | Taste feel |
|---|---|
| 1 | Highly bitter |
| 5 | Neutral |
| 10 | Sweet |

Feedback from individual volunteers was collected. An average value for the respective sample solutions was calculated and the results were presented in Table 53.

TABLE 53

Results of taste testing in human volunteers
Palatability of the drug samples using human volunteers Taste scale of samples

| Drug substance | Drug in water (Solution A) | Drug sample + Vitamin E TPGS (Solution B) | Drug sample + Vitamin E TPGS + Sucralose (Solution C) | Drug sample + Vitamin E TPGS + Sucralose + Cherry Flavour (Solution D) |
|---|---|---|---|---|
| Ranitidine hydrochloride | 1 | 3 | 5 | 5 |
| Quinine | 1 | 4 | 6 | 6 |
| Paracetamol | 2 | 5 | 6 | 6 |
| Colchicine | 2 | 5 | 6 | 7 |
| Cinacalcet hydrochloride | 2 | 5 | 6 | 7 |
| Cetirizine hydrochloride | 3 | 5 | 6 | 6 |
| Levocetirizine hydrochloride | 3 | 5 | 7 | 7 |
| Ibuprofen | 3 | 6 | 7 | 7 |
| Erythromycin | 3 | 6 | 7 | 8 |
| Ciprofloxacin | 3 | 5 | 6 | 6 |
| Chlorpheniramine maleate | 4 | 6 | 7 | 8 |
| Aspirin | 4 | 7 | 8 | 8 |
| Dextromethorphan Hydrobromide | 4 | 7 | 8 | 9 |

Ranitidine and quinine were found to be highly bitter in taste compared to other active pharmaceutical ingredients tested.

After addition of Vitamin E TPGS, there was an impact on the taste of all the drug substances tested.

To further increase the palatability, sweetener (sucralose) was added into the solution. The numerical difference between the sample with sucralose and without sucralose showed further improvement in palatability.

To check if further improvement of the palatability could be obtained, flavors were added into the solutions. The improvements obtained, if any, were minor.

A standard concentration of 25 mg/ml vitamin E TPGS was used in the development work.

From the results in the table presented above, it shows that the taste of several aqueous solutions with a bitter tasting active pharmaceutical ingredient was improved by the addition of vitamin E TPGS, Addition of sucralose as sweetener further improved palatability. Sucralose was added in a 1:1 ratio of active pharmaceutical ingredient (API) to sucralose.

Based on the results obtained in a taste evaluation test using human volunteers, it can be concluded that vitamin E TPGS can be used to taste mask bitter active pharmaceutical ingredients.

The invention claimed is:

1. An atomoxetine solution, comprising:
   a) about 4-8 mg/mL atomoxetine;
   b) about 12.5-25 mg/mL Vitamin E TPGS;
   c) about 25-120 mg/mL of propylene glycol;
   d) a preservative comprising:
      i) about 1.5-2 mg/mL of methyl paraben; and,
      ii) about 0.1-0.4 mg/mL of propyl paraben; and,
   e) about 4-6 mg/mL of sucralose;
   a flavoring agent, comprising about 1-3 mg/mL of cherry flavor; and,
   g) water;
   wherein orange flavor and peppermint flavor are absent from the solution;
   wherein sodium benzoate is absent from the solution; and,
   wherein the solution is formed from atomoxetine or a pharmaceutically acceptable salt thereof.

2. The atomoxetine solution of claim 1, comprising:
   a) about 4-8 mg/mL atomoxetine;
   b) about 12.5-25 mg/mL Vitamin E TPGS;
   c) about 114 mg/mL of propylene glycol;
   d) a preservative comprising:
      i) about 1.8 mg/mL of methyl paraben; and,
      ii) about 0.2 mg/mL of propyl paraben; and,
   e) about 5 mg/mL of sucralose;
   f) the first flavoring agent, comprising: about 2 mg/mL of cherry flavor; and,
   g) water;
   wherein the solution is formed from atomoxetine HCl.

3. The atomoxetine solution of claim 1, comprising:
   a) about 4 mg/mL atomoxetine;
   b) about 12.5 mg/mL Vitamin E TPGS;
   c) about 114 mg/mL of propylene glycol;
   d) a preservative, comprising:
      i) about 1.8 mg/mL of methyl paraben; and,
      ii) about 0.2 mg/mL of propyl paraben; and,
   e) about 5 mg/mL of sucralose;
   f) the first flavoring agent, comprising: about 2 mg/mL of cherry flavor; and,
   g) water;
   wherein the solution is formed from atomoxetine HCl.

4. The atomoxetine solution of claim 1, comprising:
   a) about 8 mg/mL atomoxetine;
   b) about 25 mg/mL Vitamin E TPGS;
   c) about 114 mg/mL of propylene glycol;

d) a preservative, comprising:
   i) about 1.8 mg/mL of methyl paraben; and,
   ii) about 0.2 mg/mL of propyl paraben; and,
e) about 5 mg/mL of sucralose;
f) the first flavoring agent, comprising: about 2 mg/mL of cherry flavor; and,
g) water;
wherein the solution is formed from atomoxetine HCl.

5. The atomoxetine solution of claim 1, wherein the solution is sorbitol-free.

6. The atomoxetine solution of claim 1, further comprising: a pH-adjusting agent.

7. The atomoxetine solution of claim 6, wherein the pH-adjusting agent is o-phosphoric acid.

8. The atomoxetine solution of claim 1, having a pH of 4 to 5.

9. The atomoxetine solution of claim 1, comprising: having a shelf-life of at least 45 days once opened.

10. A method of treating attention deficit/hyperactivity disorder (ADHD) in a patient in need thereof, comprising: administering to a patient in need thereof a therapeutically effective amount of the atomoxetine solution of claim 1.

11. The method of claim 10, wherein the patient is a pediatric patient.

12. An oral syringe, comprising the atomoxetine solution of claim 1, wherein the oral syringe is configured for dosing of 5-10 mL of the solution.

13. The atomoxetine solution of claim 1, wherein less than 0.03% w/v of a thermal degradant caused by the presence of sodium benzoate is present after subjecting the solution to 60° C. for 2 weeks.

14. The atomoxetine solution of claim 1, wherein less than 0.03% w/v of a thermal degradant caused by the presence of sodium benzoate is present after subjecting the solution to 60° C. for 4 weeks.

15. The atomoxetine solution of claim 1, wherein the taste masking combination of the sweeteners xylitol and maltitol is absent from the solution.

16. The atomoxetine solution of claim 1, comprising:
a) about 4-8 mg/mL atomoxetine;
b) a taste masking component, consisting essentially of: about 12.5-25 mg/mL Vitamin E TPGS;
c) about 25-120 mg/mL of propylene glycol;
d) a preservative consisting essentially of
   i) about 1.5-2 mg/mL of methyl paraben; and,
   ii) about 0.1-0.4 mg/mL of propyl paraben; and,
e) about 4-6 mg/mL of sucralose;
f) a flavoring agent, comprising about 1-3 mg/mL of cherry flavor; and,
g) water;
wherein the solution is formed from atomoxetine or a pharmaceutically acceptable salt thereof.

17. An atomoxetine solution, consisting essentially of:
a) about 4-8 mg/mL atomoxetine;
b) about 12.5-25 mg/mL Vitamin E TPGS;
c) about 25-120 mg/mL of propylene glycol;
d) a preservative comprising:
   i) about 1.5-2 mg/mL of methyl paraben; and,
   ii) about 0.1-0.4 mg/mL of propyl paraben; and,
e) about 4-6 mg/mL of sucralose;
f) a flavoring agent, comprising about 1-3 mg/mL of cherry flavor; and,
g) water;
wherein:
   the solution is formed from atomoxetine or a pharmaceutically acceptable salt thereof.

* * * * *